United States Patent
Barreras et al.

(10) Patent No.: US 12,533,025 B2
(45) Date of Patent: Jan. 27, 2026

(54) PROXIMITY PAIRING AND SECURITY OF A CONTINUOUS ANALYTE SENSOR SYSTEM

(71) Applicant: Dexcom, Inc., San Diego, CA (US)

(72) Inventors: Jorge R. Barreras, Dania Beach, FL (US); Reinier Sanchez Bao, Boston, MA (US)

(73) Assignee: DEXCOM, INC., San Diego, CA (US)

( * ) Notice: Subject to any disclaimer, the term of this patent is extended or adjusted under 35 U.S.C. 154(b) by 421 days.

(21) Appl. No.: 18/184,644

(22) Filed: Mar. 15, 2023

(65) Prior Publication Data

US 2023/0293009 A1    Sep. 21, 2023

Related U.S. Application Data

(60) Provisional application No. 63/269,460, filed on Mar. 16, 2022.

(51) Int. Cl.
*A61B 5/00*   (2006.01)
*A61B 5/145*   (2006.01)
(Continued)

(52) U.S. Cl.
CPC ............ *A61B 5/0004* (2013.01); *A61B 5/002* (2013.01); *A61B 5/14532* (2013.01);
(Continued)

(58) Field of Classification Search
CPC ... A61B 5/0004; A61B 5/002; A61B 5/14532; A61B 5/00; A61B 5/145; A61B 2562/08; H04W 76/10; H04W 48/10
See application file for complete search history.

(56) References Cited

U.S. PATENT DOCUMENTS

| 7,254,367 B2 | 8/2007 | Helden et al. |
| 9,591,693 B2 | 3/2017 | Stroud |

(Continued)

FOREIGN PATENT DOCUMENTS

| EP | 2883330 A4 | 4/2016 |
| WO | 2018035223 A1 | 2/2018 |

OTHER PUBLICATIONS

International Search Report and Written Opinion for Application No. PCT/US2023/064496, mailed Jun. 29, 2023, 13 pages.

(Continued)

*Primary Examiner* — Tuan H Nguyen
(74) *Attorney, Agent, or Firm* — Patterson + Sheridan LLP

(57) ABSTRACT

Techniques and protocols for facilitating wireless secure communications between a sensor system and one or more other devices are disclosed. In certain embodiments, the techniques and protocols include secure proximity pairing techniques with reduced power. A method for pairing an analyte sensor system and one or more display devices includes broadcasting, from the analyte sensor system, for an initial connection, a low power general advertisement including an indication indicating the low power general advertisement is for proximity pairing. The method includes receiving, from a first display device, a connection request message in response to the low power general advertisement; performing an authentication procedure with the first display device; and pairing and bonding with the first display device based on successful authentication with the first display device.

44 Claims, 7 Drawing Sheets

(51) Int. Cl.
    *H04W 48/10*     (2009.01)
    *H04W 76/10*     (2018.01)

(52) U.S. Cl.
    CPC ........... *H04W 48/10* (2013.01); *H04W 76/10* (2018.02); *A61B 2562/08* (2013.01)

(56) References Cited

U.S. PATENT DOCUMENTS

2020/0375455 A1* 12/2020 Van Tassel ............ H04W 48/16
2020/0397354 A1* 12/2020 Wedekind ............ A61B 5/4839

OTHER PUBLICATIONS

Retrieved from the Internet: http://newsroom.alphamicro.net/news/blog/replacing-nfc-with-ble-whisper-mode/.
Laird Connectivity, "What is Whisper Mode Connectivity?" Nov. 13, 2015, Retrieved from the Internet: https://www.lairdconnect.com/resources/blog/what-whisper-mode-pairing, 3 pages.

* cited by examiner

PROXIMITY PAIRING AND SECURITY OF A CONTINUOUS ANALYTE SENSOR SYSTEM

CROSS-REFERENCE TO RELATED APPLICATIONS

This application claims benefit of and priority to U.S. Provisional Application No. 63/269,460, filed Mar. 16, 2022, which is hereby assigned to the assignee hereof and hereby expressly incorporated by reference herein in its entirety as if fully set forth below and for all applicable purposes.

INTRODUCTION

Field

The present application relates generally to medical devices such as analyte sensors and, more particularly, to systems, devices, and methods related to wireless communications between analyte sensors (e.g., continuous glucose monitoring (CGM) devices) and one or more display devices.

Description of the Related Technology

Diabetes is a metabolic condition relating to the production or use of insulin by the body. Insulin is a hormone that allows the body to use glucose for energy, or store glucose as fat.

Diabetes mellitus is a disorder in which the pancreas cannot create sufficient insulin (Type I or insulin dependent) and/or in which insulin is not effective (Type 2 or non-insulin dependent). In the diabetic state, the victim suffers from high blood sugar, which causes an array of physiological derangements (kidney failure, skin ulcers, or bleeding into the vitreous of the eye) associated with the deterioration of small blood vessels. A hypoglycemic reaction (low blood sugar) may be induced by an inadvertent overdose of insulin, or after a normal dose of insulin or glucose-lowering agent accompanied by extraordinary exercise or insufficient food intake.

Conventionally, a diabetic patient carries a self-monitoring blood glucose (SMBG) monitor, which may require uncomfortable finger pricking methods. Due to the lack of comfort and convenience, a diabetic will normally only measure his or her glucose level two to four times per day. Unfortunately, these time intervals are spread so far apart that the diabetic will likely be alerted to a hyperglycemic or hypoglycemic condition too late, sometimes incurring dangerous side effects as a result. In fact, it is unlikely that a diabetic will take a timely SMBG value, and further the diabetic will not know if his blood glucose value is going up (higher) or down (lower), due to limitations of conventional methods.

Consequently, a variety of non-invasive, transdermal (e.g., transcutaneous) and/or implantable sensors are being developed for continuously detecting and/or quantifying blood glucose values. Generally, in a diabetes management system, these sensors wirelessly transmit raw or minimally processed data for subsequent display and/or analysis at one or more remote devices, which can include a remote device, a server, or any other types of communication devices. A remote device, such as a remote device, may then utilize a trusted software application (e.g., approved and/or provided by the manufacturer of the sensor), which takes the raw or minimally processed data and provides the user with information about the user's blood glucose levels. Because diabetes management systems using such implantable sensors can provide more up-to-date information to users, they may reduce the risk of a user failing to regulate the user's blood glucose levels.

Using a wireless connection between a transcutaneous analyte sensor and one or more display devices based on certain existing wireless communication protocols, however, may expose the sensor and/or the display devices to safety, integrity, privacy, and availability issues (e.g., sensor and/or display devices may become unavailable as a result of malicious attacks, etc.). As an example, an attacker may use a malicious device that impersonates the sensor to connect with and send inaccurate data (e.g., inaccurate blood glucose levels) to a user's display device to cause harm to the user. In another example, an attacker may use a malicious device to impersonate the user's display device, or the software application, and execute the software application on the user's display device to gain access to the user's sensor. In such an example, the attacker may receive the user's sensor data (e.g. blood glucose levels), thereby, violating the patient's privacy. Also, in such an example, the attacker may transmit data to the sensor that may cause malfunction of the sensor or sensor electronics. For example, a malicious or an impersonated display device may inaccurately calibrate the sensor, thereby causing the sensor to provide inaccurate blood glucose measurements. Further, in the same example, the attacker may disrupt a communication session that the user has already established between the user's sensor and the user's own display device that executes a trusted software application. In certain other examples, a user themselves may use an unauthenticated software application, that may be executed on the user's own display device, to connect with the user's sensor. In such an example, the unauthenticated software application may not include the necessary safety measures needed to ensure the user's data security and safety.

This background is provided to introduce a brief context for the summary and detailed description that follow. This background is not intended to be an aid in determining the scope of the claimed subject matter nor be viewed as limiting the claimed subject matter to implementations that solve any or all of the disadvantages or problems presented above.

SUMMARY

Certain embodiments of the present disclosure provide a method of pairing an analyte sensor system and one or more display devices. The method generally includes broadcasting, from the analyte sensor system, for an initial pairing, a low power general advertisement including an indication indicating the general advertisement is for proximity pairing. The method includes receiving, from a first display device, a connection request message in response to the low power general advertisement. The method includes performing an authentication procedure with the first display device. The method includes pairing with the first display device based on successful authentication with the first display device.

Further embodiments include a non-transitory computer-readable storage medium storing instructions that, when executed by a computer system, cause the computer system to perform the methods set forth above, and an apparatus including at least one processor and memory configured to carry out the methods set forth above.

DETAILED DESCRIPTION

Figure 1A:
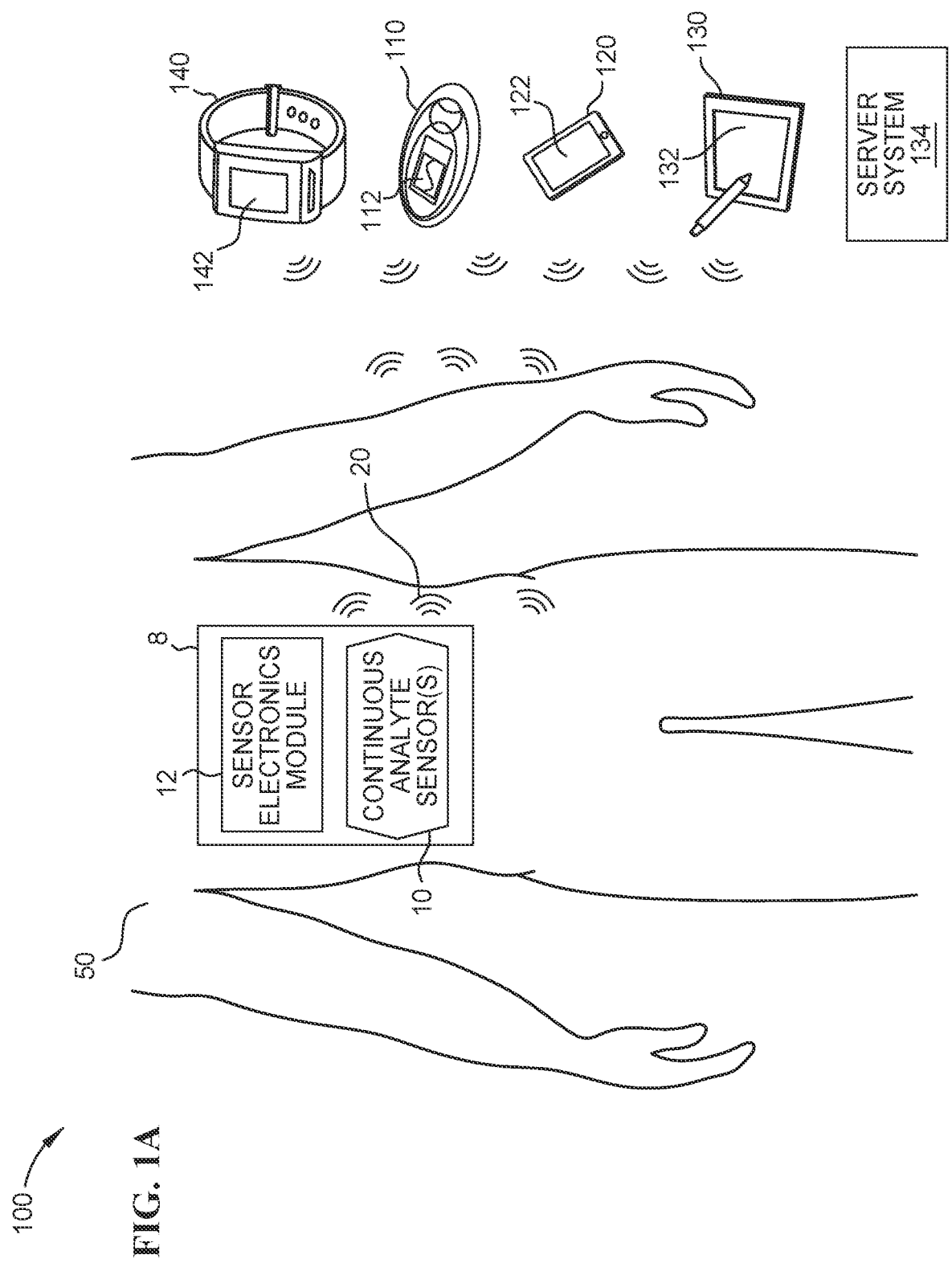
FIG. 1A illustrates an example diabetes management system, according to some embodiments disclosed herein.

Certain embodiments described herein relate to a number of different security protocols used by a display device, an analyte sensor system, a medical device (e.g., a medical delivery device) and/or a server system to establish secure wireless connections. Embodiments may reduce issues affecting system safety, integrity, privacy, and/or availability associated with wireless communications in a diabetes management. Although certain embodiments herein are described with respect to the management of diabetes, a glucose sensor system, and the transmission of glucose measurement between the devices, the protocols and techniques described herein are similarly applicable to any type of health management system that includes any type of analyte sensor (e.g., a lactate sensor, a ketone sensor, a potassium sensor, and the like).

As discussed above, security is a critical issue in wireless communication. When using Bluetooth Low Energy (BLE), Simple Secure Pairing may be used when two devices wish to communicate securely. Simple Secure Pairing establishes a secret link key to correctly authenticate devices. However, in most cases the pairing process itself is carried out on the same exposed wireless medium and is therefore still vulnerable to interceptions and attacks.

Further, according to certain current pairing protocols between an analyte sensor system (hereinafter "sensor system") and a display device, upon activation of the sensor system, the sensor system begins advertising (e.g., broadcasts advertisement packets) every five minutes for up to twenty two seconds in order to be identified by and connect with the display device. Typically, as further described in more detail herein, the twenty two seconds of advertising comprises a general advertising period as well as a whitelist advertising period. General advertising refers to advertisements broadcast by the sensor system to connect, for the first time, with the user's display devices. Whitelist advertising refers to advertisements sent by the sensor system to reconnect with a display device that the sensor system has already once paired and bonded with.

During general advertising, once an advertisement is received by the intended display device, the display device issues a connection request to the sensor system. The sensor system then receives the connection request from the display device and may grant the connection request to the display device.

When high power (e.g., substantially full power) is used by the sensor system for sending advertisements, display devices that are not intended to pair with the sensor system, including an attacker, may detect the advertisement and send connection requests to the sensor system. As such, the attacker that receives an advertisement may have an opportunity to connect to the analyte sensor system and access a user's data. Further, as described herein in more detail, when high power advertisements are used by the sensor system, in order to ensure that display device and the sensor system are trusted by the corresponding user, display device and the sensor system may be configured to perform certain user-centric authentication protocols among themselves, which may result in resource (e.g., compute, battery, time, etc.) inefficiency.

In addition, when high power advertisements are used by the sensor system, unintended display devices may detect the high power advertisements and send connection requests to the analyte sensor system, causing congestion at the sensor system. Congestion at the sensor system may prevent the sensor system from receiving a connection request from the display device that the sensor system intends to connect with or, at least, delay the connection between the intended display device and the sensor system. Note that congestion at the sensor system refers to a situation where the sensor system becomes occupied with exchanging messaging with display devices that it does not intend to communicate with.

Another technical deficiency with certain existing pairing protocols is the use of the sensor system's real BLE address in general advertisements broadcast by the sensor system to connect with an intended display device as well as in whitelist advertisements sent by the sensor system to periodically reconnect with the display device. However, when the sensor system's real BLE address is used in general advertisements, display devices that have already paired and bonded with the sensor system and, therefore, stored the sensor system's real BLE address, will attempt to reconnect with the sensor system during general advertising. However, receiving connection requests from display devices that have already paired and bonded with the sensor system during general advertising will create congestion and prevent the sensor system from achieving the goal the sensor system is configured to accomplish by sending general advertisements, which is to connect with new display devices (e.g., display devices that it has not yet paired and bonded with).

Accordingly, what is needed are methods and apparatus for securely pairing and bonding between an analyte sensor system (hereinafter "sensor system") and one or more display devices, in order to provide secure communications between the devices and also ensure that the correct devices are paired. Note that, hereinafter, although embodiments described herein refer to a sensor system performing communications with one or more display devices, it is the transmitter in the sensor system that performs the communications with the one or more display devices.

Certain embodiments described herein provide proximity pairing techniques for use between a sensor system and one or more display devices. In some embodiments, certain proximity pairing techniques described herein involve confirming the sensor system to broadcast low power general advertisement for proximity pairing. As used herein a "low power" advertisement may refer to an advertisement broadcast at a low or minimum power of the sensor system. In some embodiments, the low or minimum power may be around −40 dBm (decibel-milliwatts) for certain devices. The low power general advertisements may further include a flag indicating the general advertisement is for proximity pairing.

In some embodiments, using a low power general advertisement ensures that only devices in close proximity to the sensor system are able to detect the sensor system's advertisement, thereby reducing the possibility of an attack, i.e., a malicious device attempting to connect with the user's sensor system. In addition, use of the low power general advertisements reduces the number of display devices that detect the advertisement and send connection requests, thereby reducing congestion at the analyte sensor system.

Use of proximity pairing may further allow for skipping certain authentication protocols and/or communications typically used between a sensor system and a display device when higher power general advertisements are used. Skipping certain authentication protocols and/or communications saves resources and reduces the overall amount of time it takes the sensor system and the display device to pair and bond.

For example, when proximity pairing is used, once a display device receives a low power general advertisement with a proximity pairing flag, the display device may determine to skip an authentication protocol to be used with the sensor system based on the flag indicating proximity pairing. For example, the display device may determine not to perform a user-centric authentication protocol, such as a password authenticated key exchange (PAKE) protocol, based on the flag indicating proximity pairing.

Typically, a user-centric mutual authentication protocol is performed when proximity pairing is not used to allow each of the display device and the analyte sensor system to verify that the other is in possession of a shared secret and, therefore, trusted by the user. For example, executing a user-centric mutual authentication protocol allows each of the display device and the analyte sensor system to generate an authorization key ("K-auth") based on a shared secret (e.g., pairing code). If both the display device and the analyte sensor system generate the same K-auth as a result of performing the user-centric authentication protocol, which is subsequently verified using a key verification protocol, the display device and the sensor system are able to conclude that the other is in possession of the shared secret and, therefore, trusted by the user. As described below, because proximity pairing ensures that a display device and a sensor system are within a close proximity of each other it can be assumed that both devices are trusted and in possession of the same user, thereby, at least in some cases circumventing the need for a user-centric authentication protocol to be performed.

In some embodiments, once a sensor system connects with a display device, for additional display devices to connect, the sensor system broadcasts a higher power general advertisement. As used herein, a "higher power" advertisement may refer to an advertisement broadcast at higher power than the low power advertisement. In some embodiments, a higher power advertisement is broadcast at full power of the sensor system. In some embodiments, full power may be around 0 dBm. The higher power general advertisement does not include the flag indicating the advertisement is for proximity pairing.

In some embodiments, for reconnections, the sensor system broadcasts higher power whitelist advertisements. As used herein, a "whitelist" advertisement may refer to an advertisement that is periodically sent by the sensor system to reconnect with one or more display devices that have already paired and bonded with the sensor system. In certain embodiments, whitelist advertisements include a "whitelist" flag. In some embodiments, only devices that have previously connected and been added to a whitelist, by the sensor system, will be allowed to connect to the sensor system during the whitelist advertising. In certain embodiments, the higher power whitelist advertisements do not include a flag indicating the advertisements are for proximity pairing.

In some embodiments, after connecting with a display device, or with a threshold number of display devices, the sensor system stops transmitting low power general advertisements and only transmits higher power advertisements. In some embodiments, even after connecting with a display device, or with the threshold number of display devices, the sensor system continues transmitting low power general advertisements until the sensor system has paired with the threshold number of display devices, or for the lifetime of the sensor system.

In certain embodiments, where the sensor system continues sending general advertisements, a secondary (e.g., "fake") identifier may be included in the general advertisements sent for pairing, while a primary (e.g., "real") identifier may be included in whitelist advertisements for reconnection. In some embodiments, the sensor system broadcasts a general advertisements using a fake BLE address of the sensor system for pairing with one or more display devices. As used herein, the "fake" BLE address is a BLE address that is not the actual manufacturer assigned BLE address of the sensor system of sensor system. For reconnections with a display device that has previously paired with the sensor system of the sensor system, the sensor system includes its real BLE address in its whitelist advertisements. As further described herein, use of a fake identifier in general advertisements may prevent a display device that has already paired with the sensor system from attempting to reconnect each time general advertisements are sent during the lifetime of the sensor system.

The paring and security protocols used by the sensor system and one or more display devices to establish secure wireless connections are described more fully herein with respects to the FIGS. 1-6 below. The pairing and security protocols described herein may provide power cost savings to the sensor system and one or more display devices, while providing secure and efficient pairing between the sensor system and one or more display devices, and an improved user experience.

Example Analyte Sensor System

FIG. 1A depicts an analyte monitoring system 100 ("system 100"), such as a diabetes management system, that may be used in connection with embodiments of the present disclosure that involve gathering, monitoring, and/or providing information regarding analyte values present in a user's body, including for example the user's blood glucose values. Analyte monitoring system 100 depicts aspects of sensor system 8 (hereinafter "SS 8") that may be communicatively coupled to display devices 110 (e.g., an analyte monitoring system dedicated proprietary receiver display), 120 (e.g., a mobile phone), 130 (e.g., a tablet), and 140 (e.g., a smart watch), and/or server system 134.

In some embodiments, SS 8 is provided for measurement of an analyte in a host or a user. By way of an overview and an example, SS 8 may be implemented as an encapsulated microcontroller that makes sensor measurements, generates analyte data (e.g., by calculating values for continuous glucose monitoring data), and engages in wireless communications (e.g., via Bluetooth and/or other wireless protocols) to send such data to display devices, such as display devices 110, 120, 130, 140, and/or server system 134. Paragraphs [0137]-[0140] and FIGS. 3A, 3B, and 4 of U.S. App. No. 2019/0336053 further describe an on-skin sensor assembly that, in certain embodiments, may be used in connection with SS 8. Paragraphs [0137]-[0140] and FIGS. 3A, 3B, and 4 of U.S. App. No. 2019/0336053 are incorporated herein by reference.

In certain embodiments, SS 8 includes a sensor electronics module 12 and an analyte sensor 10 associated with sensor electronics module 12. In certain embodiments, sensor electronics module 12 includes electronic circuitry associated with measuring and processing analyte sensor data or information, including algorithms associated with processing and/or calibration of the analyte sensor data/information. Sensor electronics module 12 may be physically/mechanically connected to analyte sensor 10 and can be integral with (i.e., non-releasably attached to) or releasably attachable to analyte sensor 10.

Sensor electronics module 12 may also be electrically coupled to analyte sensor 10, such that the components may be electromechanically coupled to one another (e.g., (a) prior to insertion into a patient's body, or (b) during the insertion into the patient's body). Analyte sensor electronics module 12 may include hardware, firmware, and/or software that enable measurement and/or estimation of levels of the analyte in a host/user via analyte sensor 10 (e.g., which may be/include a glucose sensor). For example, analyte sensor electronics module 12 can include one or more potentiostats, a power source for providing power to analyte sensor 10, other components useful for signal processing and data storage, and a telemetry module for transmitting data from the sensor electronics module to one or more display devices. Electronics can be affixed to a printed circuit board (PCB) within SS 8, or platform or the like, and can take a variety of forms. For example, the electronics can take the form of an integrated circuit (IC), such as an Application-Specific Integrated Circuit (ASIC), a microcontroller, a processor, and/or a state machine.

Sensor electronics module 12 may include sensor electronics that are configured to process sensor information, such as sensor data, and generate transformed sensor data and displayable sensor information. Examples of systems and methods for processing sensor analyte data are described in more detail herein and in U.S. Pat. Nos. 7,310,544 and 6,931,327 and U.S. Patent Publication Nos. 2005/0043598, 2007/0032706, 2007/0016381, 2008/0033254, 2005/0203360, 2005/0154271, 2005/0192557, 2006/0222566, 2007/0203966 and 2007/0208245, all of which are incorporated herein by reference in their entireties.

Analyte sensor 10 is configured to measure a concentration or level of the analyte in the host. The term analyte is further defined by paragraph [0117] of U.S. App. No. 2019/0336053. Paragraph [0117] of U.S. App. No. 2019/0336053 is incorporated herein by reference. In some embodiments, analyte sensor 10 comprises a continuous glucose sensor, such as a subcutaneous, transdermal (e.g., transcutaneous), or intravascular device. In some embodiments, analyte sensor 10 can analyze a plurality of intermittent blood samples. Analyte sensor 10 can use any method of glucose-measurement, including enzymatic, chemical, physical, electrochemical, spectrophotometric, polarimetric, calorimetric, iontophoretic, radiometric, immunochemical, and the like. Additional details relating to a continuous glucose sensor are provided in paragraphs [0172]-[0076] of U.S. application Ser. No. 13/827,577. Paragraphs [0072]-[0076] of U.S. application Ser. No. 13/827,577 are incorporated herein by reference.

Note that, while in certain examples SS 8 is assumed to be a glucose sensor system, SS 8 may operate to monitor one or more additional or alternative analytes. As discussed, the term "analyte" as used herein is a broad term that is to be given its ordinary and customary meaning to a person of ordinary skill in the art (and is not to be limited to a special or customized meaning), and refers without limitation to a substance or chemical constituent in the body or a biological sample (e.g., bodily fluids, including, blood, serum, plasma, interstitial fluid, cerebral spinal fluid, lymph fluid, ocular fluid, saliva, oral fluid, urine, excretions, or exudates). Analytes can include naturally occurring substances, artificial substances, metabolites, and/or reaction products. In some embodiments, the analyte for measurement by the sensing regions, devices, and methods is albumin, alkaline phosphatase, alanine transaminase, aspartate aminotransferase, bilirubin, blood urea nitrogen, calcium, CO2, chloride, creatinine, glucose, gamma-glutamyl transpeptidase, hematocrit, lactate, lactate dehydrogenase, magnesium, oxygen, pH, phosphorus, potassium, sodium, total protein, uric acid, metabolic markers, drugs.

Other analytes are contemplated as well, including but not limited to acetaminophen, dopamine, ephedrine, terbutaline, ascorbate, uric acid, oxygen, d-amino acid oxidase, plasma amine oxidase, xanthine oxidase, NADPH oxidase, alcohol oxidase, alcohol dehydrogenase, pyruvate dehydrogenase, diols, Ros, NO, bilirubin, cholesterol, triglycerides, gentisic acid, ibuprophen, L-Dopa, methyl dopa, salicylates, tetracycline, tolazamide, tolbutamide, acarboxyprothrombin; acylcarnitine; adenine phosphoribosyl transferase; adenosine deaminase; albumin; alpha-fetoprotein; amino acid profiles (arginine (Krebs cycle), histidine/urocanic acid, homocysteine, phenylalanine/tyrosine, tryptophan); andrenostenedione; antipyrine; arabinitol enantiomers; arginase; benzoylecgonine (cocaine); biotinidase; biopterin; c-reactive protein; carnitine; carnosinase; CD4; ceruloplasmin; chenodeoxycholic acid; chloroquine; cholesterol; cholinesterase; conjugated 1-β hydroxy-cholic acid; cortisol; creatine kinase; creatine kinase MM isoenzyme; cyclosporin A; d-penicillamine; de-ethylchloroquine; dehydroepiandrosterone sulfate; DNA (acetylator polymorphism, alcohol dehydrogenase, alpha 1-antitrypsin, cystic fibrosis, Duchenne/Becker muscular dystrophy, glucose-6-phosphate dehydrogenase, hemoglobin A, hemoglobin S, hemoglobin C, hemoglobin D, hemoglobin E, hemoglobin F, D-Punjab, beta-thalassemia, hepatitis B virus, HCMV, HIV-1, HTLV-1, Leber hereditary optic neuropathy, MCAD, RNA, PKU, *Plasmodium vivax*, sexual differentiation, 21-deoxycortisol); desbutylhalofantrine; dihydropteridine reductase; diptheria/tetanus antitoxin; erythrocyte arginase; erythrocyte protoporphyrin; esterase D; fatty acids/acylglycines; free β-human chorionic gonadotropin; free erythrocyte porphyrin; free thyroxine (FT4); free tri-iodothyronine (FT3);

fumarylacetoacetase; galactose/gal-1-phosphate; galactose-1-phosphate uridyltransferase; gentamicin; glucose-6-phosphate dehydrogenase; glutathione; glutathione perioxidase; glycocholic acid; glycosylated hemoglobin; halofantrine; hemoglobin variants; hexosaminidase A; human erythrocyte carbonic anhydrase I; 17-alpha-hydroxyprogesterone; hypoxanthine phosphoribosyl transferase; immunoreactive trypsin; lactate; lead; lipoproteins ((a), B/A-1, β); lysozyme; mefloquine; netilmicin; phenobarbitone; phenyloin; phytanic/pristanic acid; progesterone; prolactin; prolidase; purine nucleoside phosphorylase; quinine; reverse tri-iodothyronine (rT3); selenium; serum pancreatic lipase; sissomicin; somatomedin C; specific antibodies (adenovirus, anti-nuclear antibody, anti-zeta antibody, arbovirus, Aujeszky's disease virus, dengue virus, *Dracunculus medinensis, Echinococcus granulosus, Entamoeba histolytica*, enterovirus, *Giardia duodenalisa, Helicobacter pylori*, hepatitis B virus, herpes virus, HIV-1, IgE (atopic disease), influenza virus, *Leishmania donovani*, leptospira, measles/mumps/rubella, *Mycobacterium leprae, Mycoplasma pneumoniae*, Myoglobin, *Onchocerca volvulus*, parainfluenza virus, *Plasmodium falciparum*, poliovirus, *Pseudomonas aeruginosa*, respiratory syncytial virus, *rickettsia* (scrub typhus), *Schistosoma mansoni, Toxoplasma gondii, Trepenoma pallidium, Trypanosoma cruzi*/rangeli, vesicular stomatis virus, *Wuchereria bancrofti*, yellow fever virus); specific antigens (hepatitis B virus, HIV-1); succinylacetone; sulfadoxine; theophylline; thyrotropin (TSH); thyroxine (T4); thyroxine-binding globulin; trace elements; transferrin; UDP-galactose-4-epimerase; urea; uroporphyrinogen I synthase; vitamin A; white blood cells; and zinc protoporphyrin. Salts, sugar, protein, fat, vitamins, and hormones naturally occurring in blood or interstitial fluids can also constitute analytes in certain embodiments.

The analyte can be naturally present in the biological fluid, for example, a metabolic product, a hormone, an antigen, an antibody, and the like. Alternatively, the analyte can be introduced into the body, for example, a contrast agent for imaging, a radioisotope, a chemical agent, a fluorocarbon-based synthetic blood, or a drug or pharmaceutical composition, including but not limited to insulin; ethanol; cannabis (marijuana, tetrahydrocannabinol, hashish); inhalants (nitrous oxide, amyl nitrite, butyl nitrite, chlorohydrocarbons, hydrocarbons); cocaine (crack cocaine); stimulants (amphetamines, methamphetamines, Ritalin, Cylert, Preludin, Didrex, PreState, Voranil, Sandrex, Plegine); depressants (barbituates, methaqualone, tranquilizers such as Valium, Librium, Miltown, Serax, Equanil, Tranxene); hallucinogens (phencyclidine, lysergic acid, mescaline, peyote, psilocybin); narcotics (heroin, codeine, morphine, opium, meperidine, Percocet, Percodan, Tussionex, Fentanyl, Darvon, Talwin, Lomotil); designer drugs (analogs of fentanyl, meperidine, amphetamines, methamphetamines, and phencyclidine, for example, Ecstasy); anabolic steroids; and nicotine. The metabolic products of drugs and pharmaceutical compositions are also contemplated analytes. Analytes such as neurochemicals and other chemicals generated within the body can also be analyzed, such as, for example, ascorbic acid, uric acid, dopamine, noradrenaline, 3-methoxytyramine (3MT), 3,4-dihydroxyphenylacetic acid (DOPAC), homovanillic acid (HVA), 5-hydroxytryptamine (5HT), histamine, Advanced Glycation End Products (AGEs) and 5-hydroxyindoleacetic acid (FHIAA).

With further reference to FIG. 1A, display devices 110, 120, 130, and/or 140 can be configured for displaying (and/or alarming) displayable sensor information that may be transmitted by sensor electronics module 12 (e.g., in a customized data package that is transmitted to the display devices based on their respective preferences). Each of display devices 110, 120, 130, or 140 may respectively include a display such as touchscreen display 112, 122, 132, and/or 142 for displaying sensor information and/or analyte data to a user and/or receiving inputs from the user. For example, a graphical user interface (GUI) may be presented to the user for such purposes.

In certain embodiments, the display devices may include other types of user interfaces such as voice user interface instead of or in addition to a touchscreen display for communicating sensor information to the user of the display device and/or receiving user inputs. In certain embodiments, one, some, or all of display devices 110, 120, 130, 140 may be configured to display or otherwise communicate the sensor information as it is communicated from sensor electronics module 12 (e.g., in a data package that is transmitted to respective display devices), without any additional prospective processing required for calibration and/or real-time display of the sensor data.

The plurality of display devices 110, 120, 130, 140 depicted in FIG. 1A may include a custom or proprietary display device. For example, display device 110 may be a proprietary receiver, especially designed for displaying certain types of displayable sensor information associated with analyte data received from sensor electronics module 12 (e.g., a numerical value and/or an arrow, in certain embodiments). In certain embodiments, one of the plurality of display devices 110, 120, 130, 140 includes a smartphone based on an Android, IOS, or another operating system (OS) configured to display a graphical representation of the continuous sensor data (e.g., including current and/or historic data).

In certain embodiments, analyte monitoring system 100 further includes a medical delivery device (e.g., an insulin pump or pen). Sensor electronics module 12 may be configured to transmit sensor information and/or analyte data to medical delivery device. The medical delivery device (not shown) may be configured to administer a certain dosage of insulin or another medicament to the user based on the sensor information and/or analyte data (e.g., which may include a recommended insulin dosage) received from the sensor electronics module 12.

Server system 134 may be used to directly or indirectly collect analyte data from SS 8 and/or the plurality of display devices, for example, to perform analytics thereon, generate universal or individualized models for glucose levels and profiles, provide services or feedback, including from individuals or systems remotely monitoring the analyte data, perform or assist SS 8 and display device 150 with identification, authentication, etc., according to the embodiments described herein, so on. Note that, in certain embodiments, server system 134 may be representative of multiple systems or computing devices that perform the functions of server system 134 (e.g., in a distributed manner).

Figure 1B:
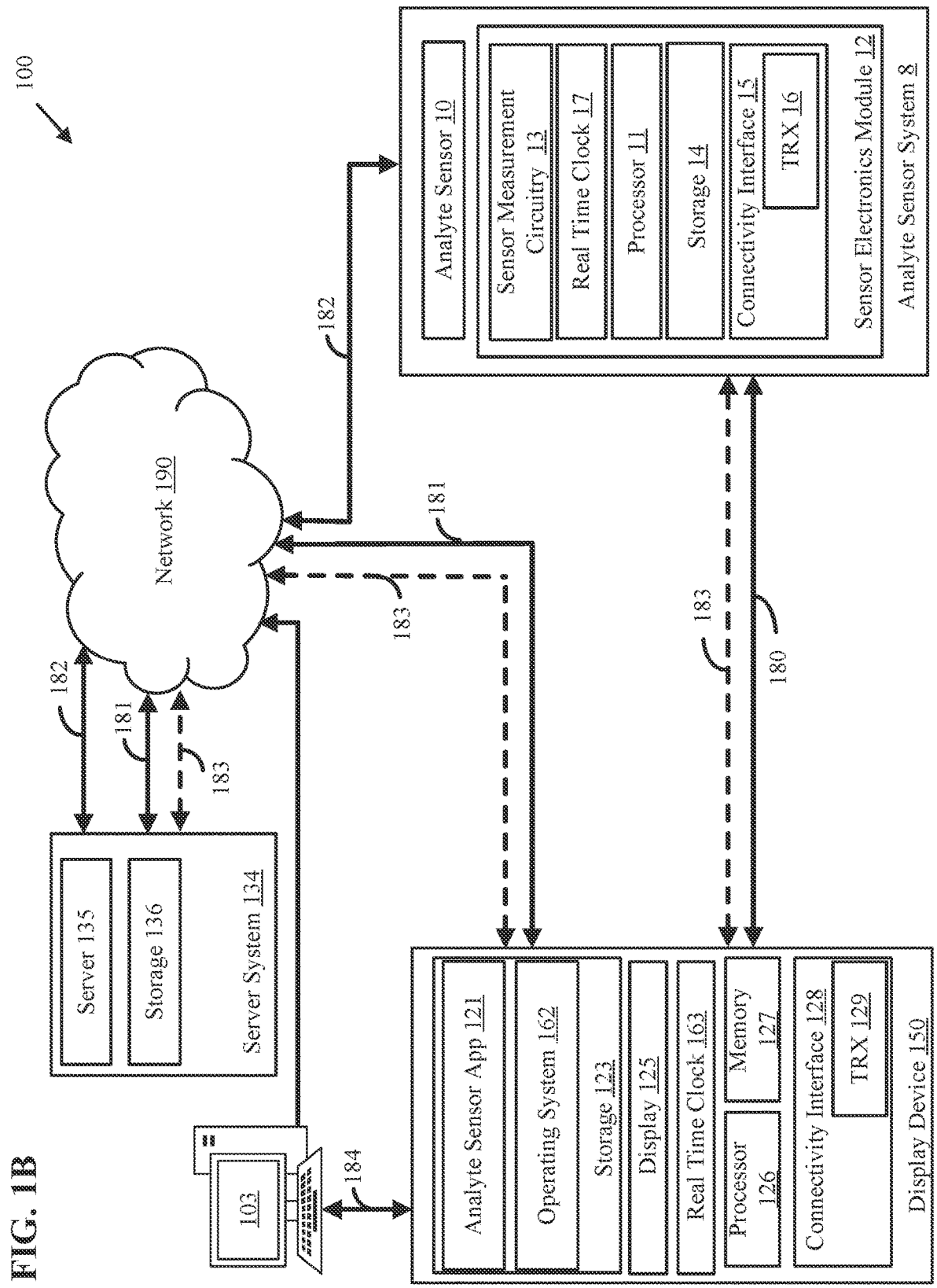
FIG. 1B illustrates the example diabetes management system of FIG. 1A in more detail, according to some embodiments disclosed herein.

FIG. 1B illustrates a more detailed view of analyte monitoring system 100 including a display device 150 that is communicatively coupled to SS 8. In certain embodiments, display device 150 may be any one of display devices 110, 120, 130, and 140 of FIG. 1A. The communication path between SS 8 and display device 150 is shown as wireless communication path 180. In certain embodiments, SS 8 and display device 150 are configured to wirelessly communicate over wireless communication path 180 using low range and/or distance wireless communication protocols. Examples of low range and/or distance wireless communication protocols include Bluetooth and Bluetooth Low Energy (BLE) protocols. In certain embodiments, other short range wireless communications may include Near Field Communications (NFC), radio frequency identification (RFID) communications, IR (infra-red) communications, optical communications, etc. In certain embodiments, wireless communication protocols other than low range and/or distance wireless communication protocols may be used for wireless communication path 180, such as WiFi Direct. Display device 150 is also configured to connect to network 190 (e.g., local area network (LAN), wide area network (WAN), the Internet, etc.). For example, display device 150 may connect to network 190 via a wired (e.g., Ethernet) or wireless (e.g., WLAN, wireless WAN, cellular, Mesh network, personal area network (PAN) etc.) interface. Display device 150 is able to communicate with server system 134 through network 190. The communication path between display device 150 and server system 134 is shown as communication path 181 via network 190.

Note that, in certain embodiments, SS 8 may be able to independently (e.g., wirelessly) communicate with server system 134 through network 190. An independent communication path between SS 8 and server system 134 is shown as communication path 182. However, in certain other embodiments, SS 8 may not be configured with the necessary hardware/software to establish, for example, an independent wireless communication path with server system 134 through network 190. In such embodiments, SS 8 may communicate with server system 134 through display device 150. An indirect or pass-through communication path between SS 8 and server system 134 is shown as communication path 183.

In embodiments where display device 150 is a proprietary display device, such as display device 110 designed specifically for the communication of analyte data, display device 150 may not be configured with the necessary hardware/software for independently connecting to network 190. Instead, in certain such embodiments, display device 150 is configured to establish a wired or wireless communication path 184 (e.g., through a Universal System Bus (USB) connection) with computer device 103, which is configured to communicate with server system 134 through network 190. For example, computer device 103 may connect to network 190 via a wired (e.g., Ethernet) or wireless (e.g., WLAN, wireless WAN, cellular, etc.) interface. Note that in the embodiments described in relation to FIGS. 2A-8, unless otherwise noted, display device 150 is assumed to be capable of independently communicating with server system 134 through network 190, independent of computer device 103.

System 100 additionally includes server system 134, which in turn includes server 135 that is coupled to storage 136 (e.g., one or more computer storage systems, cloud-based storage systems and/or services, etc.). In certain embodiments, server system 134 may be located or execute in a public or private cloud. In certain embodiments, server system 134 is located or executes on-premises ("on-prem"). As discussed, server system 134 is configured to receive, collect, and/or monitor information, including analyte data and related information, as well as encryption/authentication information from SS 8 and/or display device 150. Such information may include input responsive to the analyte data or input (e.g., the user's glucose measurements and other physiological/behavioral information) received in connection with an analyte monitoring or sensor application running on SS 8 or display device 150. This information may be stored in storage 136 and may be processed, such as by an analytics engine capable of performing analytics on the information. An example of an analyte sensor application that may be executable on display device 150 is analyte sensor application 121, as further described below.

In certain embodiments, server system 134 at least partially directs communications between SS 8 and display device 150, for example, for facilitating authentication therebetween. Such communications include messaging (e.g., advertisement, command, or other messaging), message delivery, and analyte data. For example, in certain embodiments, server system 134 may process and exchange messages between SS 8 and display device 150 related to frequency bands, timing of transmissions, security, alarms, and so on. In certain embodiments, server system 134 may also update information stored on SS 8 and/or display device 150. In certain embodiments, server system 134 may send/receive information to/from SS 8 and or display device 150 in real-time or sporadically. Further, in certain embodiments, server system 134 may implement cloud computing capabilities for SS 8 and/or display device 150.

FIG. 1B also illustrates the components of SS 8 in further detail. As shown, in certain embodiments, SS 8 includes analyte sensor 10 coupled to sensor electronics module 12. Analyte sensor electronics module 12 (shown in FIG. 1B and referred to hereafter as sensor electronics module 12) includes sensor measurement circuitry 13 that is coupled to analyte sensor 10 for processing and managing sensor data. Sensor measurement circuitry 13 may also be coupled to processor 11. In some embodiments, processor 11 may perform part or all of the functions of the sensor measurement circuitry 13 for obtaining and processing sensor measurement values from analyte sensor 10. Processor 11 may also be coupled to storage 14 and real time clock (RTC) 17 for storing and tracking sensor data. In addition, processor 11 may be further coupled to a connectivity interface 15, which includes a radio unit or transceiver (TRX) 16 for sending sensor data and receiving requests and commands from an external device, such as display device 150. As used herein, the term transceiver generally refers to a device or a collection of devices that enable SS 8 to (e.g., wirelessly) transmit and receive data. SS 8 may further include storage 14 and real time clock (RTC) 17 for storing and tracking sensor data. It is contemplated that, in some embodiments, the SMC 13 may carry out all the functions of the processor 11 and vice versa.

Transceiver 16 may be configured with the necessary hardware and wireless communications protocols for enabling wireless communications between SS 8 and other devices, such as display device 150 and/or server system 134. For example, as described above, transceiver 16 may be configured with the necessary hardware and communication protocols to establish a Bluetooth or BLE connection with display device 150. As one of ordinary skill in the art appreciates, in such an example, the necessary hardware may include a Bluetooth or BLE security manager and/or other Bluetooth or BLE related hardware/software modules configured for Bluetooth or BLE communications standards. In some embodiments where SS 8 is configured to establish an independent communication path with server system 134, transceiver 16 may be configured with the necessary hardware and communication protocols (e.g., long range wireless cellular communication protocol, such as, GSM, CDMA, LTE, VOLTE, 3G, 4G, 5G communication protocols) for establishing a wireless connection to network 190 to connect with server system 134. As discussed elsewhere, other short range protocols, may also be used for communication between display device 150 and a SS 8 such as NFC, RFID, etc.

FIG. 1B similarly illustrates the components of display device 150 in further detail. As shown, display device 150 includes connectivity interface 128, processor 126, memory 127, a real time clock 163, a display 125 for presenting a graphical user interface (GUI), and a storage 123. A bus (not shown here) may be used to interconnect the various elements of display device 150 and transfer data between these elements. Connectivity interface 128 includes a transceiver (TRX) 129 used for receiving sensor data from SS 8 and for sending requests, instructions, and/or data to SS 8 as well as server system 134. Transceiver 129 is coupled to other elements of display device 150 via connectivity interface 128 and/or the bus. Transceiver 129 may include multiple transceiver modules operable on different wireless standards. For example, transceiver 129 may be configured with one or more communication protocols, such as wireless communication protocol(s) for establishing a wireless communication path with network 190 and/or low range wireless communication protocol(s) (e.g., Bluetooth or BLE) for establishing a wireless communication path 180 with SS 8. Additionally, connectivity interface 128 may in some cases include additional components for controlling radio and/or wired connections, such as baseband and/or Ethernet modems, audio/video codecs, and so on.

In some embodiments, when a standardized communication protocol is used between display device 150 and SS 8, commercially available transceiver circuits may be utilized that incorporate processing circuitry to handle low level data communication functions such as the management of data encoding, transmission frequencies, handshake protocols, security, and the like. In such embodiments, processor 126 of display device 150 and/or processor 11 of SS 8 may not need to manage these activities, but instead provide desired data values for transmission, and manage high level functions such as power up or down, set a rate at which messages are transmitted, and the like. Instructions and data values for performing these high level functions can be provided to the transceiver circuits via a data bus and transfer protocol established by the manufacturer of transceivers 129 and 16. However, in embodiments where a standardized communication protocol is not used between transceivers 129 and 16 (e.g., when non-standardized or modified protocols are used), processors 126 and 11 may be configured to execute instructions associated with proprietary communications protocols (e.g., one or more of the communications protocols described herein) to control and manage their respective transceivers. In addition, when non-standardized or modified protocols are used, customized circuitries may be used to service such protocols.

Processor 126 may include processor sub-modules, including, by way of example, an applications processor that interfaces with and/or controls other elements of display device 150 (e.g., connectivity interface 128, analyte sensor application 121 (hereinafter "sensor application 121"), display 125, RTC 163, memory 127, storage 123, etc.). In certain embodiments, processor 126 is configured to perform functions related to device management, such as, for example, managing lists of available or previously paired devices, information related to network conditions (e.g., link quality and the like), information related to the timing, type, and/or structure of messaging exchanged between SS 8 and display device 150, and so on. Processor 126 may further be configured to receive and process user input, such as, for example, a user's biometric information, such as the user's finger print (e.g., to authorize the user's access to data or to be used for authorization/encryption of data, including analyte data), as well as analyte data.

Processor 126 may include and/or be coupled to circuitry such as logic circuits, memory, a battery and power circuitry, and other circuitry drivers for periphery components and audio components. Processor 126 and any sub-processors thereof may include logic circuits for receiving, processing, and/or storing data received and/or input to display device 150, and data to be transmitted or delivered by display device 150. As described above, processor 126 may be coupled by a bus to display 125, connectivity interface 128, storage 123, etc. Hence, processor 126 may receive and process electrical signals generated by these respective elements and thus perform various functions. By way of example, processor 126 may access stored content from storage 123 and memory 127 at the direction of analyte sensor application 121, and process the stored content to be displayed by display 125. Additionally, processor 126 may process the stored content for transmission via connectivity interface 128 to SS 8 and/or server system 134. Display device 150 may include other peripheral components not shown in detail in FIG. 1B.

In certain embodiments, memory 127 may include volatile memory, such as random access memory (RAM) for storing data and/or instructions for software programs and applications, such as analyte sensor application 121. Display 125 presents a GUI associated with operating system 162 and/or analyte sensor application 121. In various embodiments, a user may interact with analyte sensor application 121 via a corresponding GUI presented on display 125. By way of example, display 125 may be a touchscreen display that accepts touch input. Analyte sensor application 121 may process and/or present analyte-related data received by display device 150 and present such data via display 125. Additionally, analyte sensor application 121 may be used to obtain, access, display, control, and/or interface with analyte data and related messaging and processes associated with SS 8 (e.g., and/or any other medical device (e.g., insulin pump or pen) that are communicatively coupled with display device 150), as is described in further detail herein.

Storage 123 may be a non-volatile storage for storing software programs, instructions, data, etc. For example, storage 123 may store analyte sensor application 121 that, when executed using processor 126, for example, receives input (e.g., by a conventional hard/soft key or a touch screen, voice detection, or other input mechanism), and allows a user to interact with the analyte data and related content via display 125. In various embodiments, storage 123 may also store user input data and/or other data collected by display device 150 (e.g., input from other users gathered via analyte sensor application 121). Storage 123 may further be used to store volumes of analyte data received from SS 8 (or any other medical data received from other medical devices (e.g., insulin pump, pen, etc.) for later retrieval and use, e.g., for determining trends and triggering alerts.

As described above, SS 8, in certain embodiments, gathers analyte data using analyte sensor 10 and transmits the same or a modified version of the collected data to display device 150. Data points regarding analyte values may be gathered and transmitted over the life of analyte sensor 10 (e.g., in the range of 1 to 30 days or more). New measurements may be transmitted often enough to adequately monitor glucose levels. In certain embodiments, rather than having the transmission and receiving circuitry of each of SS 8 and display device 150 continuously communicate, SS 8 and display device 150 may regularly and/or periodically establish a communication channel among each other. Thus, in such embodiments, SS 8 may, for example, communicate with display device 150 at predetermined time intervals. The duration of the predetermined time interval can be selected to be long enough so that SS 8 does not consume too much power by transmitting data more frequently than needed, yet frequent enough to provide substantially real-time sensor information (e.g., measured glucose values or analyte data) to display device 150 for output (e.g., via display 125) to the user. While the predetermined time interval is every five minutes in some embodiments, it is appreciated that this time interval can be varied to be any desired length of time. In other embodiments, transceivers 129 and 16 may be continuously communicating. For example, in certain embodiments, transceivers 129 and 16 may establish a session or connection there between and continue to communicate together until the connection is lost.

Analyte sensor application 121 may be downloaded, installed, and initially configured/setup on display device 150. For example, display device 150 may obtain analyte sensor application 121 from server system 134, or from another source, such as an application store or the like, via a network, e.g., network 190. Following installation and setup, analyte sensor application 121 may be configured to access, process, and/or interface with analyte data (e.g., whether stored on server system 134, locally from storage 123, from SS 8, or any other medical device). By way of example, analyte sensor application 121 may present a menu that includes various controls or commands that may be executed in connection with the operation of SS 8, display device 150, one or more other display devices (e.g., display device 110, 130, 140, etc.), and/or one or more other partner devices, such as an insulin pump. For example, analyte sensor application 121 may be used to interface with or control other display and/or partner devices, for example, to deliver or make available thereto analyte data, including for example by receiving/sending analyte data directly to the other display and/or partner device and/or by sending an instruction for SS 8 and the other display and/or partner device to be connected.

In certain embodiments, after downloading analyte sensor application 121, as one of the initial steps, the user may be directed by analyte sensor application 121 to wirelessly connect display device 150 to the user's SS 8, which the user may have already placed on their body. A wireless communication path 180 between display device 150 and SS 8 allows SS 8 to transmit analyte measurements to display device 150 and for the two devices to engage in any of the other interactions described above. However, as discussed, using a wireless communication path between display device 150 and SS 8, based on certain existing wireless communication protocols, may expose display device 150, SS 8, and/or server system 134 to safety, integrity, privacy, and availability issues. Similarly, establishing other communication paths in analyte monitoring system 100 (e.g., communication path 181 between display device 150 and server system 134 as well as communication path 183 between SS 8 and server system 134) using certain existing communication protocols also exposes display device 150, SS 8, and/or server system 134 to safety, integrity, privacy, and availability issues.

Example Proximity Pairing and Secure Connection of Analyte Sensor System and One or More Display Devices Establishing a secure wireless connection between SS 88 and display device 150 may involve engaging in identification, authentication, pairing, and/or bonding protocols or methods. Identification protocols may be designed, for example, to allow display device 150 to effectively identify SS 8 while reducing the likelihood of an attacker being able to obtain any information during the identification process that may become useful in impersonating SS 8, display device 150. Authentication protocols may be designed to allow SS 8 and display device 150 to verify whether the other peer device is trusted by a user of the device and/or a root authority. Pairing and bonding protocols may be designed to allow for the exchange of information between SS 8 and display device 150 to establish an encrypted connection for communication.

In certain embodiments, SS 8 and display device 150 conform to one or more wireless protocols and standards (e.g., Bluetooth®, Bluetooth Low Energy (BLE)). For example, SS 8 and display device 150 may be configured with BLE related hardware and software for communication. Accordingly, SS 8 and display device 150 may engage in identification, authentication, pairing, and/or bonding in accordance with the BLE standards.

As discussed above, pairing advertisements that are broadcast at high power (e.g., full power) may be detected by display devices 150 in a large vicinity. The display devices that detect the advertisements may include display devices that are not intended to pair with SS 8. Such display devices 150 may request connection to SS 8. Connection requests from display devices that are not intended to pair with SS 8 may cause congestion at SS 8 which may delay the connection of an intended display device. In addition, an attacker may detect the advertisement and attempt to connect to SS 8 and access the user's data.

Embodiments herein provide for using proximity pairing. Proximity pairing may involve sending low power general advertisements that can only be detected by devices in proximity to SS 8. Use of low power general advertisements may ensure that the intended display device (i.e., a display device that the user of SS 8 intends for SS 8 to connect with) is the only display device that detects the low power general advertisement and attempts to connect to SS 8. Use of low power general advertisements helps reduce congestion at SS 8 caused by multiple display devices sending connection requests and also improves security of the pairing process by ensuring that devices that attempt to connect to SS 8 are device within close proximity of SS 8, which are more likely to be trusted devices. In some embodiments, proximity pairing is used for an initial pairing with a first display device and regular pairing (higher power advertisements) is used for reconnections with the first display device and for connecting with additional display devices that SS 8 has not already paired and bonded with.

In some embodiments, a fake BLE address of SS 8 is used for general advertisements and a real BLE address of SS 8 is used for whitelist advertisements. Use of advertisements with a fake BLE address for initial pairing and a real BLE address for reconnection and connecting additional display devices allows display devices to filter out advertisements that are not intended for them. The ability of display devices to filter out advertisements further reduced overhead spent by the display devices in sending connection requests to unintended sensor systems while also reducing congestion at the sensor system.

Figure 2:
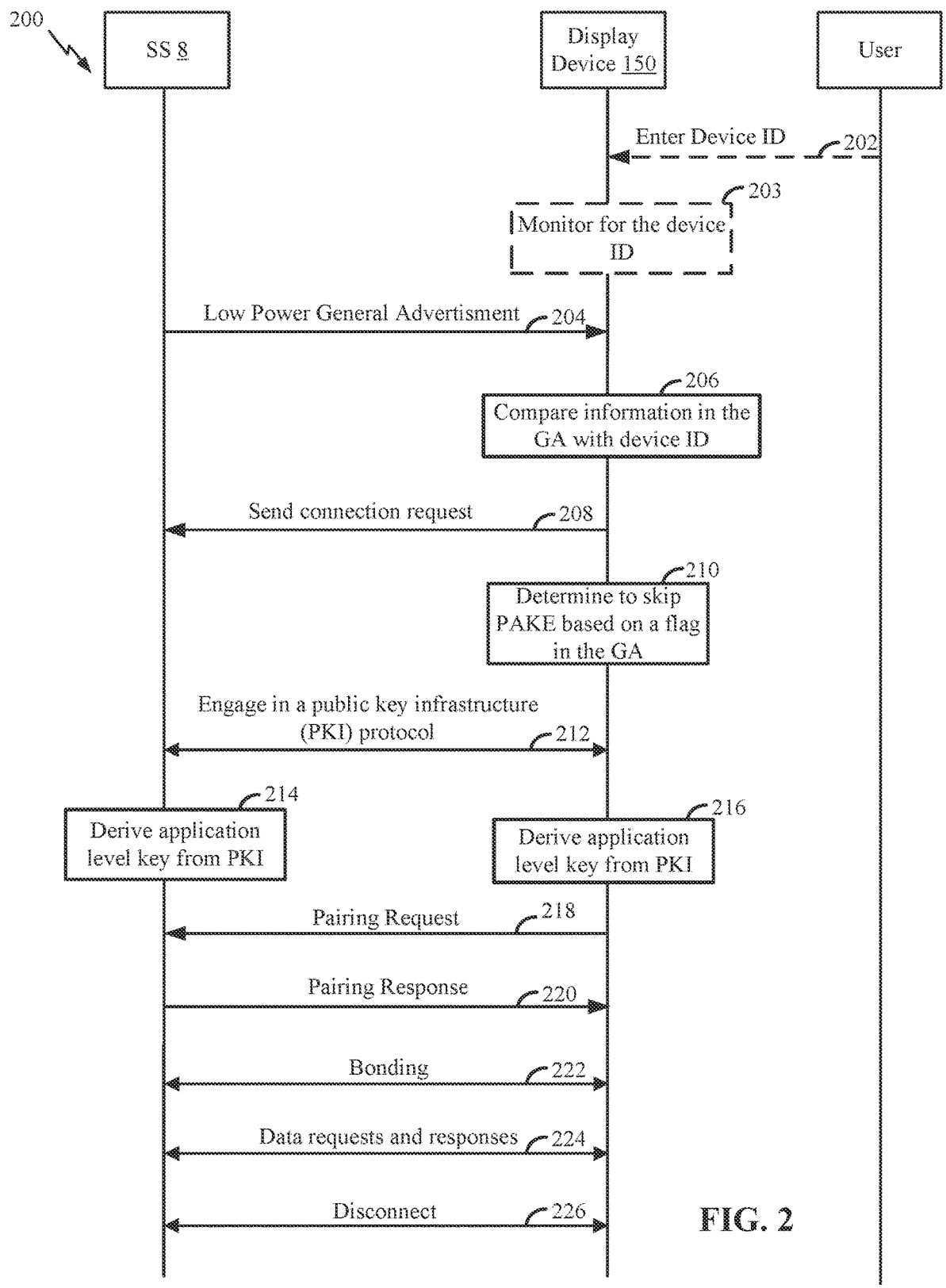
FIG. 2 is a call flow diagram illustrating the execution of certain security protocols to establish secure wireless communications between the analyte sensor system and a first display device, according to certain embodiments disclosed herein.

FIG. 2 is a call flow diagram 200 illustrating the execution of security protocols for the establishment of secure wireless communications between SS 8 and display device 150, according to certain embodiments disclosed herein. Note that some of the steps illustrated in FIG. 2 may be performed in a different order than illustrated in FIG. 2 or may be performed in parallel or overlap in time. Accordingly, the reference numbers assigned to the different steps illustrated in FIG. 2 may not be indicative of the order in which they are performed, in certain embodiments.

Also, while call flow diagram 200 illustrates the execution of security protocols for establishing secure wireless communications between SS 8 and display device 150, steps illustrated in call flow diagram 200 may be similarly followed when establishing secure wireless communication between SS 8 and one of a variety of other devices (e.g., a router, a hub, or any other computing device). In some embodiments, call flow diagram 200 illustrates security protocols for an initial connection between SS 8 and a first display device 150. That is, in some embodiments, the steps of flow diagram 200 may be performed when SS 8 has not yet paired with any display devices.

In the embodiments of FIG. 2, prior to performing authentication, pairing, and bonding, display device 150 and SS 8 are first configured to identify each other. Steps 202-208 may be performed as part of an "identification phase."

At step 202, display device 150 obtains a device ID from a user entering the device ID into display device 150. The device ID may be a sensor system ID (e.g., a 7-character identifier of the sensor electronics module 12 of SS 8) or a serial number (e.g., a 12-character identifier) of the sensor electronics module 12 of the SS 8. Display device 150 may obtain the sensor system ID through other mechanisms, such as by scanning information associated with the sensor system, or the like. For example, the user may use display device 150, which may be equipped with an image scanner, to scan a bar code or QR code placed on SS 8 itself or a package thereof. The bar code or QR code may indicate the device ID.

At step 203, once display device 150 has obtained the device ID, display device 150 is configured to begin monitoring for advertisements that include the device ID in order to identify SS 8. As part of the monitoring, in certain embodiments, display device 150 filters out general advertisements that seem to have been sent by devices that are not within proximity to display device 150. For example, display device 150 may filter out general advertisements that do not have a flag indicating the general advertisement is for proximity pairing. In addition, the display device 150 may filter out general advertisements with a signal strength (e.g., a receive signal strength indicator (RSSI) measurement) above a predetermined threshold. In some embodiments, display device 150 is configured for filtering (e.g., to filter based on the proximity flag and/or based on the RSSI). For example, analyze sensor application 121 may configure display device 150 for the filtering.

Generally, when SS 8 (or its sensor electronics module 12) is first activated, in order to be identified by and pair with one or more display devices, SS 8 is configured to broadcast general advertisements. In the embodiments of FIG. 2, at step 204, SS 8 broadcasts a low power general advertisement. A low power general advertisement packet may be broadcast over multiple frequency channels. SS 8 may broadcast the low power general advertisement periodically at defined intervals. In some embodiments, SS 8 broadcasts the low power general advertisement as soon as SS 8 is powered on. In some embodiments, as discussed in more detail below with respect to FIG. 5, the low power general advertisement is not broadcast until after sensor verification (e.g., which may take from twenty seconds up to two minutes).

Due to the low power of the advertisement, display device 150 will not detect the low power general advertisement unless display device 150 is within a relatively close proximity (e.g., within 1 foot or even in direct contact with) of the SS 8. This proximity-enhanced security adds an extra level of trust that can be used to authenticate SS 8 and display device 150. That is, it is assumed that if SS 8 and display device 150 are in close proximity, it is unlikely that the SS 8 or display device 150 is accidentally connecting with an incorrect device or an attacker.

The low power general advertisement packet may include a flag (e.g., in a manufacturer flag field), indicating that the low power general advertisement is for proximity pairing. As discussed in more detail below, the flag indicating the low power general advertisement is for proximity pairing may indicate to a display device a type of authentication protocol to be performed. For example, as described in relation to step 210, when the flag indicates the low power general advertisement is for proximity pairing, the display device 150 and SS 8 may skip the PAKE authentication protocol.

The low power general advertisement packet may include a BLE address (e.g., a 48-bit BLE MAC address) of SS 8. The low power advertisement may include a fake BLE address. Use of a fake BLE address in the general advertisement may ensure that a display device that has already paired with SS 8 would not re-attempt to pair each time SS 8 broadcasts a general advertisement (e.g., because such display devices begin searching for the real BLE address after the initial connection). Refraining from re-attempting to pair each time a general advertisement is broadcast reduces congestion at SS 8. For example, if display devices that have previously paired and bonded with SS 8 (e.g., and have been added to a whitelist) detect a general advertisement and send connection requests to SS 8. SS 8 may be occupied with those connection requests (e.g., processing and denying connection) and may be delayed in processing connection requests from display devices that have not yet paired and bonded with SS 8.

With use of a fake BLE address in the general advertisement, however, display devices that have previously paired and bonded with SS 8 will only send connection requests in response to advertisements with the real BLE address, thereby reducing congestion at SS 8. Further, a fake BLE address may provide additional security because SS 8 may not provide its real information, for example, until pairing and bonding is performed. In some embodiments, the fake BLE address is the manufacturer assigned BLE address with the least significant bit (LSB) of the BLE address flipped.

Figure 5:
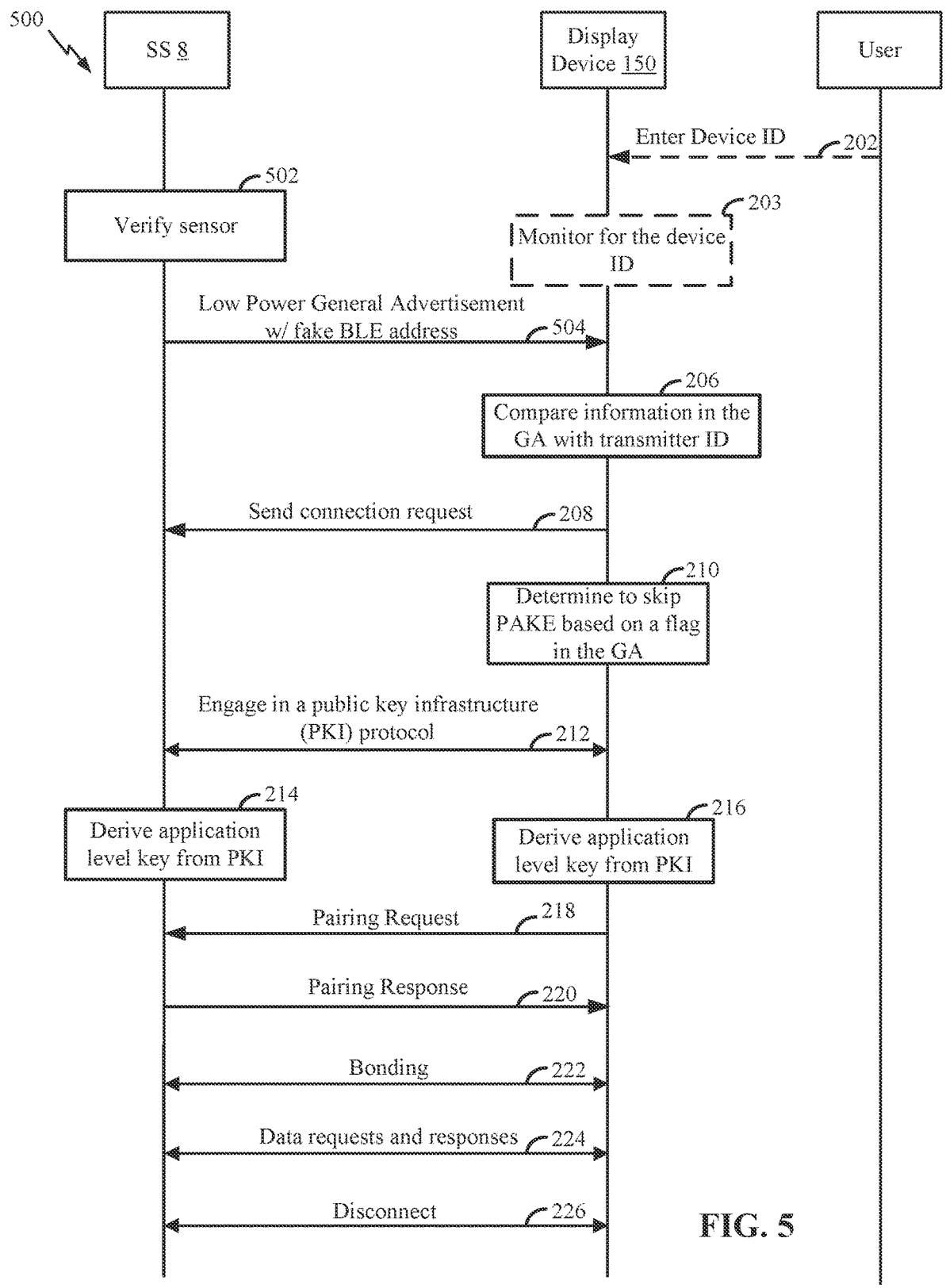
FIG. 5 is another call flow diagram illustrating the execution of certain security protocols to establish secure wireless communications between the analyte sensor system and the first display device, according to certain embodiments disclosed herein.

As discussed above, for additional display devices to pair and bond with SS 8, SS 8 may continue to broadcast low power general advertisements until a whitelist threshold is met or for the lifetime of SS 8. Accordingly, additional devices may request connection upon detection of subsequent low power general advertisements similar to as shown in FIG. 5 for an initial device. In some embodiments, a fake BLE address is used for all low power general advertisements. As described above, use of a fake BLE address in subsequent low power general advertisements reduces congestion at SS 8 by preventing devices that previously bonded with SS 8 from sending connection requests to SS 8 because such devices, after bonding with SS 8, look for the real BLE address.

The low power general advertisement packet further includes a device ID or a version thereof. As discussed, the device ID may include the sensor system ID or a version thereof, or a manufacturer assigned serial number (e.g., a 12-digit serial number) or a version thereof. For example, the low power general advertisement may include a hash of the sensor system's manufacturer assigned serial number. In another example, the low power general advertisement may include a truncated hash of the sensor system's manufacturer assigned serial number (e.g., the last two digits of the hash of the sensor system's manufacturer assigned serial number).

Figure 3:
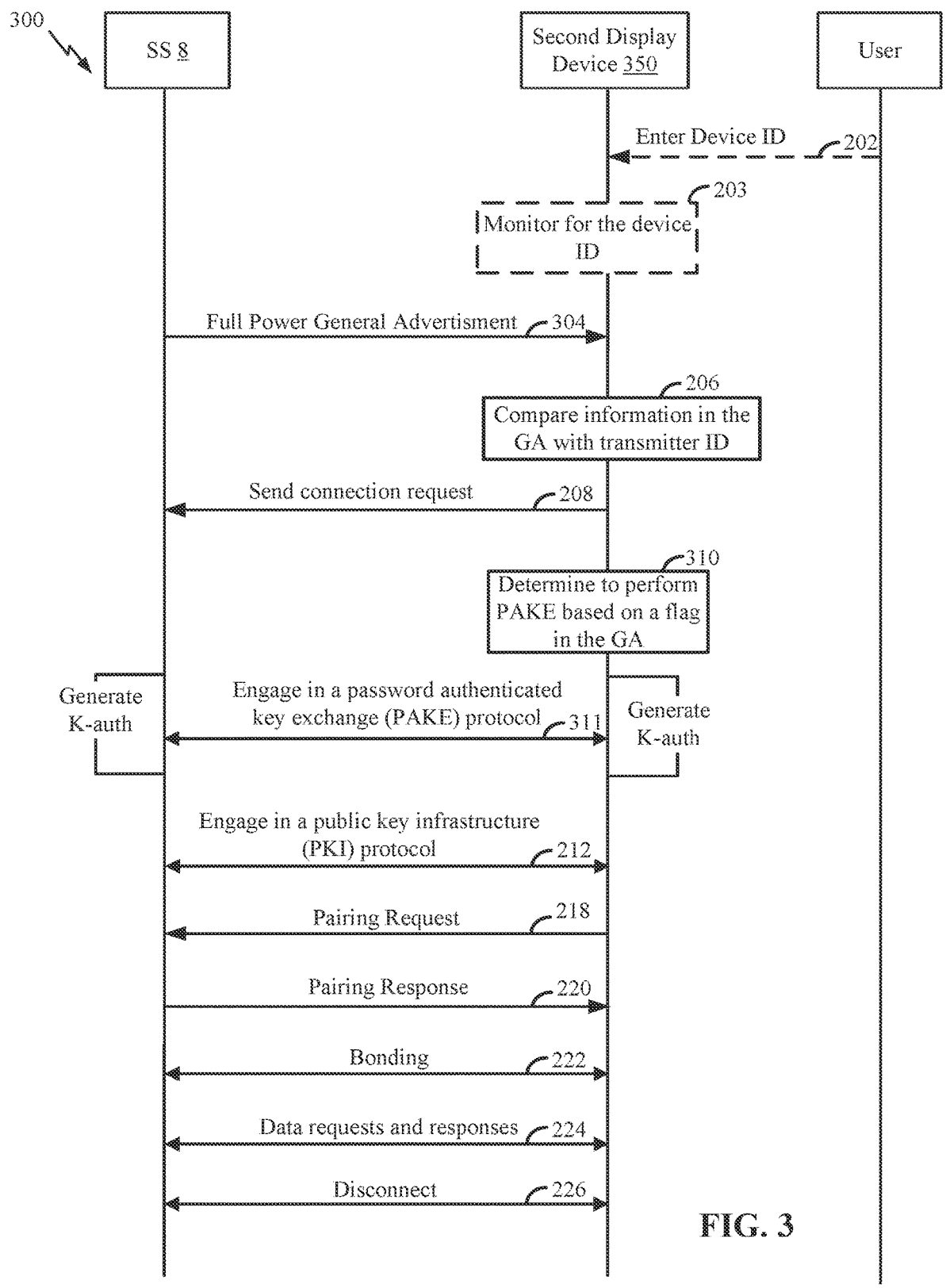
FIG. 3 is a call flow diagram illustrating the execution of certain security protocols to establish secure wireless communications between the analyte sensor system and a second display device, according to certain embodiments disclosed herein.

At step 206, display device 150 may then compare the device ID obtained by display device 150 with the device ID advertised by SS 8 (e.g., the sensor system ID, the serial number, the hash of serial number, or the truncated hash of the serial number) in the low power general advertisement at step 204. If the obtained device ID and the advertised device ID are the same, display device 150 identifies that SS 8 is the correct SS to connect with. FIG. 3 and paragraphs [0195]-[0104] of the '754 application, incorporated by reference above, provide an example identification protocol that is based on hashing, truncating, and/or a combination of both.

After detecting the low power general advertisement and identifying that the advertisement packet includes a device ID that matches the device ID held by display device 150, then at step 208, display device 150 may send a connection request at step 208 to SS 8. In response, in some embodiments, SS 8 sends a connection response message to display device 150 indicating the request is granted.

After the identification phase, SS 8 and display device 150 may perform mutual authentication during an authentication phase. Steps 210-216 may be performed as part of the authentication phase. In some embodiments, during the authentication phase, SS 8 and display device 150 may use low power transmissions in exchanging messages. In some other embodiments, during the authentication phase, SS 8 and display device 150 may use full power transmissions in exchanging messages. As described in more detail below, when the identification phase is performed using proximity pairing, a user-centric authentication protocol such as PAKE may be skipped during the authentication phase, as further described in relation to FIG. 2. On the other hand, when the identification phase is performed without using proximity pairing, both PKI and PAKE are performed during the authentication phase, as further described in relation to FIG. 3.

Therefore, according to certain embodiments, the authentication protocol(s) performed between SS 8 and display device 150 may be based on whether the devices engage in proximity pairing during the identification phase, as indicated by the proximity pairing flag in the advertisement. As shown in FIG. 2, at step 210, display device 150 determines to skip PAKE or a similar user-centric authentication protocol, based on the flag. Note that, the use of a flag is an example and that any other indication may be used in low power general advertisements to indicate that SS 8 intends to engage in proximity pairing.

PAKE is a key exchange protocol designed to allow two peer devices (e.g., display device 150 and SS 8) to generate or derive a high entropy authentication key (e.g., K-auth, which may be an advanced encryption standard (AES) key) from a shared low entropy secret (e.g., a pairing code associated with SS 8). If, as a result of executing the PAKE protocol, both display device 150 and SS 8 generate the same K-auth, then SS 8 and display device 150 are able to conclude that the other is in possession of the shared secret and, therefore, trusted by the user.

In certain embodiments, the SS 8 and display device 150 may be configured to execute the PAKE protocol at the application layer. Examples of PAKE include Juggling PAKE or J-PAKE, EC-J-PAKE (elliptic curve cryptography), SPEKE (simple password exponential key exchange), CRS-J-PAKE (common reference string-J-PAKE), AuCPace (Augmented Composable Password Authenticated Connection Establishment), BSPEKE (a "B" extension for SPEKE), zkPAKE (zero-knowledge PAKE), C2C-PAKE (client to client PAKE), and EKE (encrypted key exchange). FIG. 5 and paragraphs [0128]-[0138] of the '754 application, incorporated by reference above, provides an example SS 8 and display device 150 executing the PAKE protocol.

As described above, the PAKE protocol is used to authenticate SS 8 and display device 150 by ensuring that the user trusts both the display device 150 and the SS 8. Proximity pairing, similarly, ensures that the display device 150 and SS 8 are within a close proximity of each other, given that display device 150 will not detect the low power general advertisement unless display device 150 is close enough to SS 8 and, therefore, will not send a connection request to SS 8 if it is not close to SS 8. Because display device 150 and SS 8 are close to each other, it is assumed that the display device 150 and SS 8 are trusted and in possession of the same user. Accordingly, PAKE can be skipped when proximity pairing is performed.

In the embodiments of FIG. 2, even though display device 150 and SS 8 skip PAKE, the two devices still perform other types of authentication. For example, display device and SS 8 may perform a public key infrastructure (PKI) protocol and generate an application level key based on performing the PKI. PKI refers to a set of roles, policies, hardware, software, and procedures for creating managing, distributing, using, storing, and revoking certificates as well as managing public-key encryption. In a typical PKI scheme, each device may generate or be configured with a key-pair, including a public key and a private key. When information is encrypted using the private key, only the corresponding public key can be used to decrypt that information and vice versa. A public key of the device may be disseminated widely while the device's private key is typically known only to the device and not shared with any other devices. In some embodiments, before engaging in call flow 200, display device 150 first obtains authentication data, including a public and private key-pair, from a server system (e.g., server system 134) during a set-up process of a sensor application, which executes on display device 150.

PKI binds public keys with respective identities of devices. The binding is established through a process of registration and issuance of certificates at and by a certificate authority (CA). The primary role of the CA is to digitally sign and publish the public key bound to a given device. The CA's own private key is used, so that trust in the user key relies on one's trust in the validity of the CA's key. In certain embodiments, the server system 134 performs the functions of a root CA (RCA) by issuing and, directly or indirectly, signing certificates of display device 150 and SS 8. An RCA is an entity that verifies all other entities in a system.

At step 212, display device 150 and SS 8 may perform PKI. FIGS. 4C and 11 and paragraphs [0212]-[0223] of the '754 application, incorporated by reference above, provide an example of display device 150 and SS 8 performing the PKI protocol. Display device 150 uses its public and private key-pair when performing PKI with SS 8. In some embodiments, SS 8 is configured with its key-pair during the manufacturing process of SS 8. One example of display device 150 obtaining authentication data from a server system is described in FIGS. 2A and 2B and paragraphs [0063]-[0065] of U.S. application Ser. No. 17/308,754, filed May 5, 2021, and entitled "SECURE HEALTH MANAGEMENT SYSTEM", which is incorporated herein by reference in its entirety (hereinafter referred to as the "'754 application").

As shown in FIG. 2, based on performing PKI, SS 8 and display device 150 can each derive an application level key (e.g., a shared key) at steps 214 and 216, respectively. In some embodiments, SS 8 and display device 150 can each derive an application level key from a private key and a public key, obtained during the PKI, by, for example, performing an Elliptic Curve Diffie-Hellman (EDCH) key agreement algorithm. It should be noted that the EDCH key agreement algorithm is one example technique to derive an application level key from a private key and public key, however, other techniques can be used to derive the application level key.

Although not shown in FIG. 2, SS 8 and display device 150 may perform additional authentication protocols. In some embodiments, SS 8 and display device 150 perform a key verification protocol after the PKI. In some embodiments, SS 8 and display device 150 perform a proof-of-possession (POP) authentication protocol after the PKI. FIGS. 6A-6C and paragraphs [0143]-[0171] of the '754 application, incorporated by reference above, provides example key verification protocols.

After the authentication phase, SS 8 and display device 150 may perform pairing and bonding. Steps 218-222 may be performed as part of the pairing and bonding phase. In some embodiments, during the pairing and bonding phase, SS 8 and display device 150 may use low power transmissions in exchanging messages. In some embodiments, during the pairing and bonding phase, SS 8 and display device 150 may use higher or full power transmissions in exchanging messages.

At step 218, display device 150 may send a pairing request to SS 8 and, at step 220, SS 8 may respond with a pairing response. In some examples, according to the wireless protocols and standards (e.g., BLE secure mode pairing and bonding standards), the pairing process involves the exchange of information, such as information relating to Input/Output (IO) capabilities, Man-In-The-Middle (MITM) protection, etc. During the pairing between SS 8 and display device 150, the two devices may agree on a temporary key (TK), whose value may depend on the pairing method that is used.

At step 222, SS 8 and display device 150 engage in bonding. During bonding, the devices may store additional information about each other. For example, after the exchange of security features and the encryption of the connection during pairing, the devices bond by generating and exchanging a long term key (LTK) and storing the LTK for later use.

After bonding with display device 150, SS 8 may add display device 150 to a whitelist. A whitelist may be a data array or some other data structure maintained in memory by SS 8 and may include devices with which SS 8 has previously paired and bonded. By adding display device 150 to a whitelist, SS 8 and display device 150 may more quickly reconnect for subsequent connections. For example, certain identification, authentication, and pairing and bonding steps may be skipped for reconnections as described in more detail with respect to FIG. 4.

After pairing and bonding, SS 8 and display device 150 are ready to exchange data over a secure connection. For example, SS 8 may encrypt data (e.g., at the BLE layer), including analyte measurements associated with the user, for transmission to display device 150 at step 224 using the LTK. Display device 159 may similarly encrypt data for transmission to SS 8 using the LTK.

Further details regarding identification, authentication, pairing, and/or bonding described with respect to FIG. 2 can be found in the various specifications of such technologies (e.g., Bluetooth specification), which is incorporated herein by reference in its entirety. The specifications may be provided by the governing bodies of such technologies.

As mentioned previously, SS 8 gathers analyte data and transmits the same or a modified version of the collected data to display device 150. Data points regarding analyte values may be gathered and transmitted over the life of SS 8 (e.g., in the range of 1 to 30 days or more). New measurements may be transmitted often enough to adequately monitor analyte levels of a user of SS 8. In certain embodiments, for power savings, rather than having the transmission and receiving circuitry of each of SS 8 and display device 150 continuously communicate, SS 8 and display device 150 may regularly and/or periodically establish a communication channel among each other.

Thus, in such embodiments, SS 8 may, for example, communicate with display device 150 at predetermined time intervals (e.g., by switching between a sleep mode and an operational mode periodically). The duration of the predetermined time interval can be selected to be long enough so that SS 8 does not consume too much power by transmitting data more frequently than needed, yet frequent enough to provide substantially real-time sensor information (e.g., measured glucose values or analyte data) to the display device for output to the user. This time interval can be varied to be any desired length of time. For example, in certain embodiments, SS 8 may "wake up" every few minutes (e.g., five minutes) to exchange data with display device 150 but go into a sleep mode in-between the intervals. Each time SS 8 "wakes up", SS 8 and display device 150 may perform security protocols for re-establishing a secure wireless connection between the two devices. In other embodiments, SS 8 and display device 150 may be continuously communicating. For example, in certain embodiments, SS 8 and display device 150 may establish a session or connection there between and continue to communicate together until the connection is lost.

In the embodiments of FIG. 2, SS 8 is configured to go into sleep mode subsequent to pairing, bonding, and exchanging data with display device 150. Accordingly, at step 226, SS 8 and display device 150 disconnects.

As described above, after bonding with display device 150, SS 8 adds information (e.g., generic access profile (GAP) address) about display device 150 to a whitelist for reconnections. In some embodiments, a threshold may be configured for the whitelist. A whitelist threshold may be used by SS 8 to determine whether to continue general advertising after disconnecting with display device 150 or during subsequent advertising sessions (e.g., every 5 minutes) when SS 8 wakes up. For example, SS 8 may have a single whitelist and a corresponding threshold of one (1), meaning that SS 8 is configured to connect with only one device at a time. In such an example, if SS 8 is configured to perform general advertising for 2 seconds when it is first activated, SS 8 may determine to stop broadcasting general advertisements, once it has paired and bonded with display device 150, for the remainder of the first 2 second general advertising session and/or during next advertising sessions (e.g., every 5 minutes). In such an example, SS 8 will only perform whitelist advertising during the next advertising sessions to reconnect with display device 150, as further described in relation to FIG. 4.

In some embodiments, SS 8 may be configured with multiple whitelists, each with a corresponding configured threshold. In such embodiments, each whitelist may be associated with a different type of device. For example, SS 8 may have a first whitelist for commercial display devices (e.g., display device 150 in FIG. 1) and a second whitelist for medical devices, such as a proprietary receiver (e.g., display device 110 in FIG. 1). In the example above, SS 8's first whitelist threshold for commercial display devices may be one (1) and the second whitelist threshold for medical devices may also be one (1).

Figure 4:
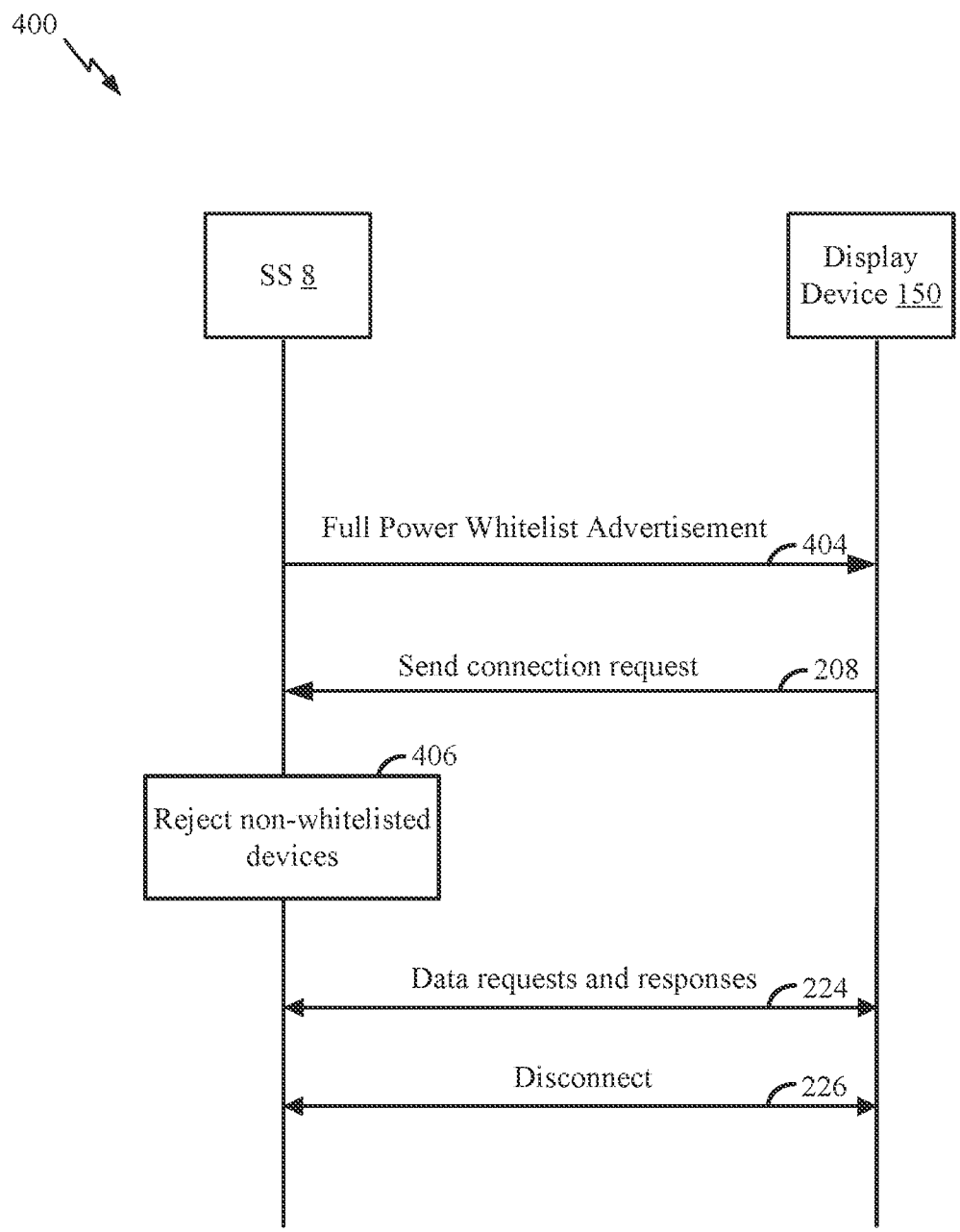
FIG. 4 is a call flow diagram illustrating the execution of certain security protocols to reestablish secure wireless communications between the analyte sensor system and the first display device, according to certain embodiments disclosed herein.

In such an example, assuming display device 150 is a commercial display device, after pairing and bonding with display device 150, SS 8 may determine that SS 8's whitelist threshold for commercial display devices has been met. However, in this example, because SS 8's threshold for its second whitelist is not met yet, SS 8 may continue sending additional general advertisements for additional devices to pair with SS 8, as shown in FIG. 3. Where SS 8 determines that both whitelist thresholds have been met, SS 8 stops broadcasting general advertisements and will only broadcast whitelist advertisements going forward, as shown in FIG. 4.

In some embodiments, SS 8 has configured periods for sending whitelist advertisements and configured periods for sending general advertisements. For example, during an advertising session where SS 8 performs both general advertising and whitelist advertising, SS 8 may broadcast general advertisements for 2 seconds and spend 20 seconds broadcasting whitelist advertisements.

As described above, when SS 8 determines that a whitelist threshold has not been met it may proceed to perform the call flow diagram 300 to pair with one or more additional devices. FIG. 3 is a call flow diagram 300 illustrating the execution of certain security protocols to establish secure wireless communications between SS 8 and a second display device 350, according to certain embodiments disclosed herein. As shown in FIG. 3, steps 202, 203, 206, 208, 212, and 218-226 may be performed similar to as described above with respect to FIG. 2. At step 203, once second display device 350 has obtained the device ID, second display device 350 is configured to begin monitoring for advertisements that include the device ID in order to identify SS 8. In some embodiments, proximity pairing is used only for connecting to a first display device 150. Accordingly, second display device 350 may not filter advertisements by proximity (e.g., unlike first display device 150 does at step 203).

At step 304, for additional connecting devices, unlike for an initial connection at step 204, SS 8 may broadcast a full power general advertisement rather than the low power general advertisement.

In addition, the full power general advertisement may include a flag indicating the advertisement is not for proximity. Alternatively, absence of a flag may indicate the advertisement is not for proximity pairing. Accordingly, at step 310, second display device 350 determines to perform PAKE based on detecting the general advertisement is not for proximity pairing. As shown in FIG. 3, SS 8 and second display device 350 may engage in the PAKE protocol at step 311 to generate a K-auth. If both display device 150 and SS 8 generate the same K-auth, then SS 8 and display device 150 each conclude that the other is in possession of the shared secret and, therefore, is trusted by the user.

After SS 8 pairs with second display device 350 or one or more further additional devices, SS 8 may determine that the one or more whitelist thresholds have been met. As discussed above, in some embodiments, once the one or more whitelist thresholds have been met, SS 8 may stop sending general advertisements and may only send whitelist advertisements for reconnection to one or more devices that previously paired with SS 8. FIG. 4 is a call flow diagram 400 illustrating the execution of certain security protocols to reestablish secure wireless communications between SS 8 and the first display device 150, according to certain embodiments disclosed herein.

At 404, SS 8 broadcasts a whitelist advertisement. In some embodiments, the whitelist advertisement is broadcast at full power. In some embodiments, the whitelist advertisement includes a flag indicating the advertisement is a whitelist advertisement. In some embodiments, the whitelist advertisement includes the real BLE address of SS 8. In some embodiments, SS 8 will only accept connection requests from a display device previously added to its one or more whitelists. At step 406, SS 8 rejects connection requests from devices that are not its one or more whitelists. Accordingly, when display device 150 sends a connection request, at step 208, SS 8 will grant the connection request because display device 150 previously paired with SS 8 and was added to SS 8's whitelist. In some embodiments, authentication and pairing and bonding steps may be skipped because display device 150 previously paired with SS 8. Although not shown, in some embodiments, a rekeying procedure may be performed. FIG. 8 and paragraphs [0184]-[0188] of the '754 application, incorporated by reference above, provides example re-keying protocols. After connecting, SS 8 and display device 150 may exchange data, at 224, and subsequently disconnect at step 226.

As mentioned above, FIG. 5 is a call flow diagram 500 illustrating another embodiment for the execution of certain security protocols to establish secure wireless communications between SS 8 and display device 150. FIG. 5 may illustrate an alternative to the embodiment illustrated in the call flow diagram 200 in FIG. 2, for establishing an initial connection between SS 8 and a first display device 150. That is, in some embodiments, the steps of flow diagram 500 may be performed when SS 8 has not yet paired with any display devices.

Steps 202, 203, and 206-226 may be performed as described above with respect to FIG. 2.

In some embodiments, as shown at step 502, SS 8 waits until analyte sensor 10 is verified before broadcasting a low power advertisement at step 504. In one example, the sensor verification may include sensor insertion and/or activation process. In such example, upon an insertion of the analyte sensor 10 into the user's body, an electric current or sensor data count above a certain threshold may trigger an activation or a proper insertion of the analyte sensor 10. The low power advertisement may include the flag indicating the advertisement is for proximity pairing. The low power advertisement may further include a full device ID (e.g., the serial number).

The low power advertisement may further include a fake BLE address. As discussed above, with use of a fake BLE address in the general advertisement, display devices that have previously paired and bonded with SS 8 will only send connection requests in response to advertisements with the real BLE address and not in response to advertisements with the fake BLE address, thereby reducing congestion at SS 8.

As discussed above, for additional display devices to pair and bond with SS 8, SS 8 may continue to broadcast low power general advertisements until a whitelist threshold is met or for the lifetime of SS 8. Accordingly, additional devices may request connection upon detection of subsequent low power general advertisements similar to as shown in FIG. 5 for an initial device. In some embodiments, a fake BLE address is used for all low power general advertisements.

In some other embodiments, however, a fake BLE address is used only in the low power general advertisement for the initial pairing with a first device and the real BLE address is used in subsequent low power general advertisements. In such embodiments, because the subsequent low power general advertisements include the real BLE address, display devices that have previously paired and bonded with SS 8 may send connection requests to SS 8 during general advertising. As such, when subsequent advertisements use the real BLE address, SS 8 may be configured to filter connection requests from whitelist display device that previously paired and bonded with SS 8. For example, SS 8 upon receiving connection requests, may filter such connection requests from whitelisted display devices, after sending the low power general advertisements having the flag indicating the advertisement is for proximity pairing. In one example, connection requests (from the whitelisted display devices) may contain one or more flags to indicate a status (e.g., whitelist) of the display device. For reconnections, SS 8 may broadcast low or full power whitelist advertisements with the real BLE address and SS 8 may filter connection requests from devices that have not previously paired and bonded with SS 8 (e.g., display devices that have not been added to the whitelist). For example, SS 8 may filter connection requests from devices that have not previously paired and bonded with SS 8 based on the advertisement having a flag indicating the advertisement is a whitelist advertisement. In some embodiments, a display device 150 that has not previously paired and bonded with SS 8 may filter advertisements based on the advertisement having the flag indicating the advertisement is a whitelisted advertisement. In one example, an advertisement may include a flag indicating whether the SS 8 is discoverable or not.

Figure 6:
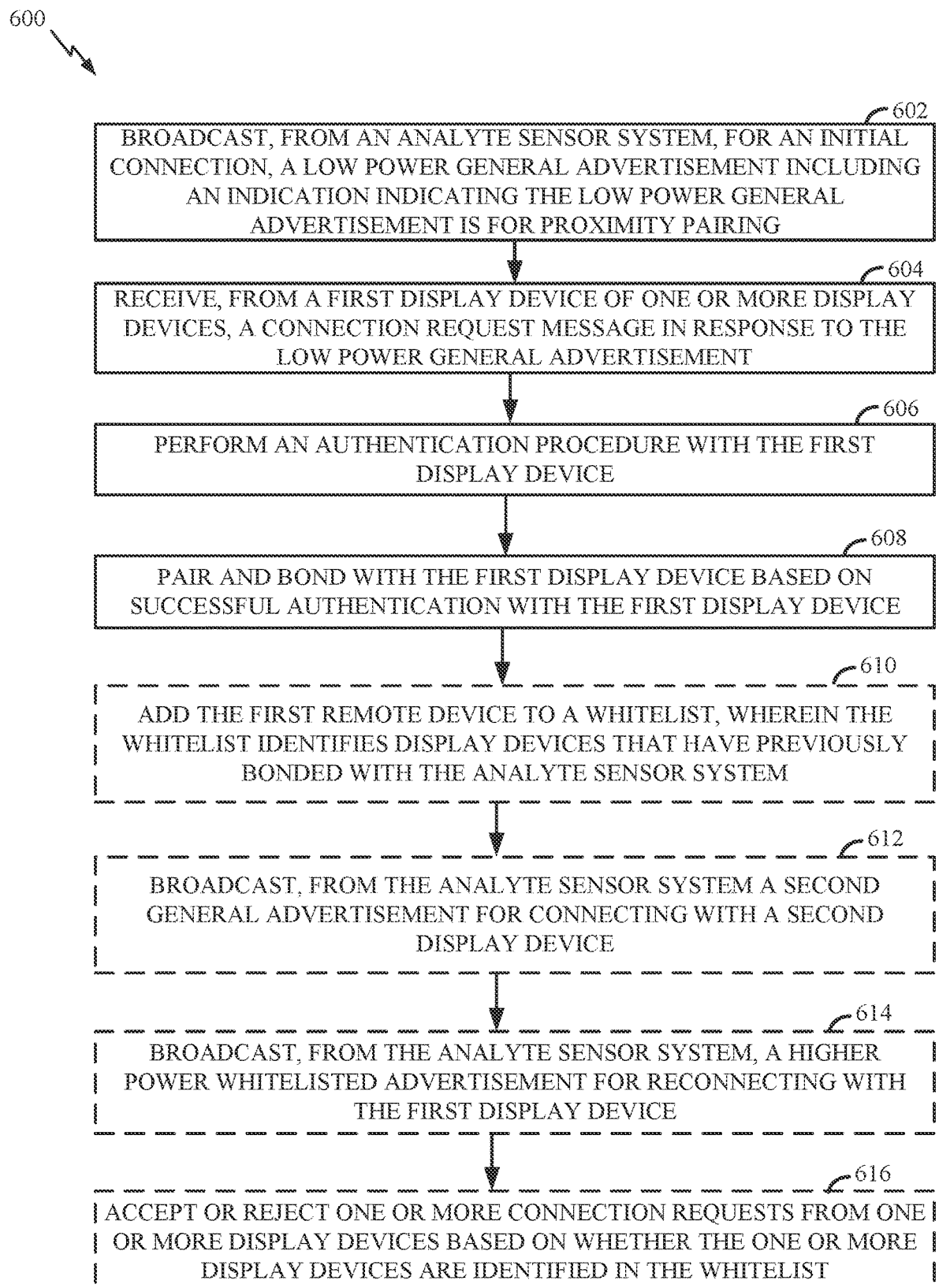
FIG. 6 is a flow diagram illustrating example operations for pairing an analyte sensor system and one or more display devices, according to certain embodiments disclosed herein.

FIG. 6 is a flow diagram illustrating example operations 600 for pairing a sensor system and one or more display devices, according to certain embodiments disclosed herein.

At operation 602, the sensor system (e.g., SS 8) broadcasts, for an initial connection, a low power general advertisement including an indication indicating the low power general advertisement is for proximity pairing. In some embodiments, the low power general advertisement is broadcast at −40 dBm. Broadcasting a lower power general advertisement for an initial connection is shown and described in more detail with respect to step 204 in FIG. 2.

At operation 604, the sensor system receives, from a first display device (e.g., display device 150), a connection request message in response to the low power general advertisement. In some embodiments, the connection request message from the first display device is received in response to the first display device detecting the field indicating the general advertisement is for proximity pairing. Monitoring for and receiving advertisements and sending a connection request by a display device are shown and described in more detail with respect to steps 203, 204, 206, and 208 in FIG. 2.

At operation 606, the sensor system performs an authentication procedure with the first display device. In some embodiments, performing the authentication procedure includes skipping performing a user-centric authentication protocol, such as the password-authenticated key agreement (PAKE), based on the indication in the low power general advertisement indicating that the general advertisement is for proximity pairing. Determining an authentication procedure and performing the authentication procedure between a sensor system and display device is shown and described in more detail with respect to steps 210-216 in FIG. 2.

At operation 608, the sensor system pairs and bonds with the first display device based on successful authentication with the first display device. In some embodiments, after pairing with the first display device, the sensor system sends, to the first display device, analyte data indicative of blood glucose levels from the sensor system. Pairing and bonding is shown and described in more detail with respect to steps 218-222 in FIG. 2.

At operation 610, the sensor system adds the first display device to a whitelist. The whitelist identifies display devices that have previously bonded with the sensor system.

At operation 612, the sensor system broadcasts a second general advertisement for connecting with a second display device. In some embodiments, the second general advertisement is a higher power general advertisement, including a field indicating the higher power general advertisement is not for proximity pairing. In some embodiments, the higher power general advertisement is broadcast at full power. Broadcasting a higher power general advertisement for connecting with a second display device is shown and described in more detail with respect to step 304 in FIG. 3. In some embodiments, the second general advertisement is a low power general advertisement, including a field indicating the low power general advertisement is for proximity pairing. Broadcasting a low power general advertisement for connecting with a second display device is shown and described in more detail with respect to FIG. 5.

At operation 614, the sensor system broadcasts a higher power whitelist advertisement pairing for a reconnection with the first display device, the whitelist advertisement including a field indicating the general advertisement is not for proximity. Broadcasting a higher power whitelist advertisement for reconnection is shown and described in more detail with respect to step 404 in FIG. 4.

In some embodiments, the low power general advertisement includes a fake address associated with the sensor system, and the higher power whitelist advertisement includes the actual address. The address associated with the sensor system may be a Bluetooth low energy (BLE) address, and the fake address may be the real BLE address with one or more bits flipped. Broadcasting a general advertisement with a fake BLE address is shown and described in more detail with respect to step 504 in FIG. 5.

At operation 616, the sensor system accepts or rejects one or more connection requests from one or more display devices based on whether the one or more display devices are identified in the whitelist. Rejecting connection requests from non-whitelist devices is shown and described in more detail with respect to step 406 in FIG. 4.

Example Aspects

Implementation examples are described in the following numbered clauses:

Clause 1: A method for pairing an analyte sensor system and one or more display devices, the method comprising: broadcasting, from the analyte sensor system, for an initial connection, a low power general advertisement including an indication indicating the low power general advertisement is for proximity pairing; receiving, from a first display device of the one or more display devices, a connection request message in response to the low power general advertisement; performing an authentication procedure with the first display device; and pairing and bonding with the first display device based on successful authentication with the first display device.

Clause 2: The method of Clause 1, wherein the low power general advertisement is broadcast at a power level of −40 dBm or lower.

Clause 3: The method of any combination of Clauses 1-2, wherein the indication indicating the low power general advertisement is for proximity pairing comprises a flag in the low power general advertisement.

Clause 4: The method of any combination of Clauses 1-3, further comprising: broadcasting, from the analyte sensor system a higher power general advertisement for connecting with a second display device, wherein the higher power general advertisement is broadcast at a higher power than the low power general advertisement, and wherein the higher power general advertisement includes an indication indicating the higher power general advertisement is not for proximity pairing.

Clause 5: The method of Clause 4, wherein the higher power general advertisement is broadcast at a maximum power of a transmitter of the analyte sensor system.

Clause 6: The method of any combination of Clauses 1-5, further comprising: adding the first display device to a whitelist, wherein the whitelist identifies display devices that have previously bonded with the analyte sensor system; broadcasting, from the analyte sensor system, a higher power whitelist advertisement for a reconnection with the first display device, wherein the higher power whitelist advertisement is broadcast at a higher power than the low power general advertisement, and wherein the higher power whitelist advertisement includes a second indication indicating the higher power whitelist advertisement is not for proximity pairing; accepting a reconnection request from the first display device after broadcasting the higher power whitelist advertisement for the reconnection and in response to determining that the first display device is a whitelist device based on the whitelist; and rejecting one or more connection requests from one or more display devices in response to determining that the one or more display devices are not whitelist devices based on the whitelist.

Clause 7: The method of Clause 6, wherein the low power general advertisement includes a secondary identifier associated with the analyte sensor system.

Clause 8: The method of Clause 7, wherein the secondary identifier associated with the analyte sensor system comprises a Bluetooth low energy (BLE) address with one or more bits flipped.

Clause 9: The method of any combination of Clauses 6-8, wherein the higher power whitelist advertisement includes a primary identifier associated with the analyte sensor system.

Clause 10: The method of Clause 9, wherein the primary identifier comprises a manufacturer assigned Bluetooth low energy (BLE) address.

Clause 11: The method of any combination of Clauses 1-10, further comprising: broadcasting, from the analyte sensor system, a second low power general advertisement for connecting with a second display device, the second low power general advertisement including a second indication indicating the second low power general advertisement is for proximity pairing.

Clause 12: The method of Clause 11, wherein the second low power general advertisement includes a secondary identifier associated with the analyte sensor system.

Clause 13: The method of Clause 12, wherein the secondary identifier associated with the analyte sensor system comprises a Bluetooth low energy (BLE) address with one or more bits flipped.

Clause 14: The method of any combination of Clauses 11-13, further comprising: accepting a connection request from the second display device after broadcasting the second low power general advertisement and in response to determining that the second display device is not a previously whitelisted device; and rejecting one or more connection requests from one or more display devices in response to determining that the one or more display devices are previously whitelisted devices.

Clause 15: The method of Clause 14, further comprising: determining that the second display device is not a previously whitelisted device and that the one or more display device are previously whitelisted devices based on a whitelist maintained at the analyte sensor system.

Clause 16: The method of any combination of Clauses 14-15, further comprising: determining that the second display device is not a previously whitelisted device and that the one or more display device are previously whitelisted devices based on a whitelist indication in the connection request and the one or more connection requests.

Clause 17: The method of any combination of Clauses 1-16, wherein the connection request message from the first display device is received in response to the first display device determining the analyte sensor system is within a threshold proximity range of the first display device.

Clause 18: The method of any combination of Clauses 1-17, wherein the connection request message from the first display device is received in response to the first display device detecting the indication indicating the low power general advertisement is for proximity pairing.

Clause 19: The method of any combination of Clauses 1-18, wherein performing the authentication procedure with the first display device comprises: skipping performing a user-centric authentication protocol in response to the indication indicating the low power general advertisement is for proximity pairing.

Clause 20: The method of Clause 19, wherein the user-centric authentication protocol comprises a password authenticated key agreement (PAKE) protocol.

Clause 21: The method of Clause 20, wherein performing the authentication procedure with the first display device comprises: skipping the PAKE protocol; and performing a public key infrastructure (PKI) protocol.

Clause 22: The method of any combination of Clauses 1-21, wherein performing the authentication procedure with the first display device comprises: exchanging authentication messages with the first display device, at the low power, during the authentication procedure.

Clause 23: The method of any combination of Clauses 1-22, further comprising: after pairing and bonding with the first display device, sending, to the first display device, analyte data indicative of blood glucose levels from the analyte sensor system.

Clause 24: An apparatus, comprising: a memory comprising executable instructions; and a processor configured to execute the executable instructions and cause the apparatus to perform a method in accordance with any combination of Clauses 1-23.

Clause 25: An apparatus, comprising means for performing a method in accordance with any combination of Clauses 1-23.

Clause 26: A non-transitory computer-readable medium comprising executable instructions that, when executed by a processor of an apparatus, cause the apparatus to perform a method in accordance with any combination of Clauses 1-23.

Clause 27: A computer program product embodied on a computer-readable storage medium comprising code for performing a method in accordance with any combination of Clauses 1-23.

Clause 28: An analyte sensor system configured to perform a method in accordance with any combination of Clauses 1-23.

Additional Considerations

Each of these non-limiting examples can stand on its own or can be combined in various permutations or combinations with one or more of the other examples. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round", a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for wireless communication at an analyte sensor system, comprising:
   broadcasting, from the analyte sensor system, for an initial connection, a low power general advertisement including an indication indicating the low power general advertisement is for proximity pairing;
   receiving, from a first display device, a connection request message in response to the low power general advertisement;
   performing an authentication procedure with the first display device;
   pairing and bonding with the first display device based on successful authentication with the first display device;
   adding the first display device to a whitelist maintained at the analyte sensor system, wherein the whitelist identifies display devices that have previously bonded with the analyte sensor system;
   broadcasting, from the analyte sensor system, a higher power whitelist advertisement for a reconnection with the first display device, wherein the higher power whitelist advertisement is broadcast at a higher power than the low power general advertisement, and wherein the higher power whitelist advertisement includes a second indication indicating the higher power whitelist advertisement is not for proximity pairing;
   accepting a reconnection request from the first display device after broadcasting the higher power whitelist advertisement for the reconnection and in response to determining that the first display device is a whitelist device based on the whitelist; and
   rejecting one or more connection requests from one or more display devices in response to determining that the one or more display devices are not whitelist devices based on the whitelist.

2. The method of claim 1, wherein the low power general advertisement is broadcast at a power level of −40 dBm or lower.

3. The method of claim 1, wherein the indication indicating the low power general advertisement is for proximity pairing comprises a flag in the low power general advertisement.

4. The method of claim 1, further comprising:
broadcasting, from the analyte sensor system a higher power general advertisement for connecting with a second display device, wherein the higher power general advertisement is broadcast at a higher power than the low power general advertisement, and wherein the higher power general advertisement includes an indication indicating the higher power general advertisement is not for proximity pairing.

5. The method of claim 4, wherein the higher power general advertisement is broadcast at a maximum power of a transmitter of the analyte sensor system.

6. The method of claim 1, wherein the low power general advertisement includes a secondary identifier associated with the analyte sensor system.

7. The method of claim 6, wherein the secondary identifier associated with the analyte sensor system comprises a Bluetooth low energy (BLE) address with one or more bits flipped.

8. The method of claim 1, wherein the higher power whitelist advertisement includes a primary identifier associated with the analyte sensor system.

9. The method of claim 8, wherein the primary identifier comprises a manufacturer assigned Bluetooth low energy (BLE) address.

10. The method of claim 1, further comprising:
broadcasting a second low power general advertisement for connecting with a second display device, the second low power general advertisement including a second indication indicating the second low power general advertisement is for proximity pairing.

11. The method of claim 10, wherein the second low power general advertisement includes a secondary identifier associated with the analyte sensor system.

12. The method of claim 11, wherein the secondary identifier associated with the analyte sensor system comprises a Bluetooth low energy (BLE) address with one or more bits flipped.

13. The method of claim 10, further comprising:
accepting a connection request from the second display device after broadcasting the second low power general advertisement and in response to determining that the second display device is not a previously whitelisted device; and
rejecting one or more connection requests from the one or more display devices in response to determining that the one or more display devices are previously whitelisted devices.

14. The method of claim 13, further comprising:
determining that the second display device is not a previously whitelisted device and that the one or more display device are previously whitelisted devices based on the whitelist maintained at the analyte sensor system.

15. The method of claim 13, further comprising:
determining that the second display device is not a previously whitelisted device and that the one or more display device are previously whitelisted devices based on a whitelist indication in the connection request and the one or more connection requests.

16. The method of claim 1, wherein the connection request message from the first display device is received when the analyte sensor system is within a threshold proximity range of the first display device.

17. The method of claim 1, wherein the connection request message from the first display device is received based on the indication indicating the low power general advertisement is for proximity pairing.

18. The method of claim 1, wherein performing the authentication procedure with the first display device comprises:
skipping performing a user-centric authentication protocol in response to the indication indicating the low power general advertisement is for proximity pairing.

19. The method of claim 18, wherein the user-centric authentication protocol comprises a password authenticated key agreement (PAKE) protocol.

20. The method of claim 19, wherein performing the authentication procedure with the first display device comprises:
skipping the PAKE protocol; and
performing a public key infrastructure (PKI) protocol.

21. The method of claim 1, wherein performing the authentication procedure with the first display device comprises:
exchanging authentication messages with the first display device, at the low power, during the authentication procedure.

22. The method of claim 1, further comprising:
sending, to the first display device after pairing and bonding with the first display device, analyte data indicative of blood glucose levels from the analyte sensor system.

23. An analyte sensor system, comprising:
at least one memory comprising executable instructions;
at least one processor in data communication with the at least one memory and configured to execute the executable instructions to cause the analyte sensor system to:
broadcast, for an initial connection, a low power general advertisement including an indication indicating the low power general advertisement is for proximity pairing;
receive, from a first display device, a connection request message in response to the low power general advertisement;
perform an authentication procedure with the first display device;
pair and bond with the first display device based on successful authentication with the first display device;
add the first display device to a whitelist maintained at the analyte sensor system, wherein the whitelist identifies display devices that have previously bonded with the analyte sensor system;
broadcast, from the analyte sensor system, a higher power whitelist advertisement for a reconnection with the first display device, wherein the higher power whitelist advertisement is broadcast at a higher power than the low power general advertisement, and wherein the higher power whitelist advertisement includes a second indication indicating the higher power whitelist advertisement is not for proximity pairing;
accept a reconnection request from the first display device after the higher power whitelist advertisement for the reconnection is broadcast and in response to a determination that the first display device is a whitelist device based on the whitelist; and reject one or more connection requests from one or more display devices in response to a determination that the one or more display devices are not whitelist devices based on the whitelist.

24. The analyte sensor system of claim 23, wherein the at least one processor is configured to cause the analyte sensor system to broadcast the low power general advertisement at a power level of −40 dBm or lower.

25. The analyte sensor system of claim 23, wherein the indication indicating the low power general advertisement is for proximity pairing comprises a flag in the low power general advertisement.

26. The analyte sensor system of claim 23, wherein the at least one processor is further configured to cause the analyte sensor system to broadcast a higher power general advertisement for a connection with a second display device, wherein the higher power general advertisement is broadcast at a higher power than the low power general advertisement, and wherein the higher power general advertisement includes an indication indicating the higher power general advertisement is not for proximity pairing.

27. The analyte sensor system of claim 26, wherein the at least one processor is configured to cause the analyte sensor system to broadcast the higher power general advertisement at a maximum transmit power of the analyte sensor system.

28. The analyte sensor system of claim 23, wherein the low power general advertisement includes a secondary identifier associated with the analyte sensor system.

29. The analyte sensor system of claim 28, wherein the secondary identifier associated with the analyte sensor system comprises a Bluetooth low energy (BLE) address with one or more bits flipped.

30. The analyte sensor system of claim 23, wherein the higher power whitelist advertisement includes a primary identifier associated with the analyte sensor system.

31. The analyte sensor system of claim 30, wherein the primary identifier comprises a manufacturer assigned Bluetooth low energy (BLE) address.

32. The analyte sensor system of claim 23, wherein the at least one processor is further configured to cause the analyte sensor system to:
broadcast a second low power general advertisement for connecting with a second display device, the second low power general advertisement including a second indication indicating the second low power general advertisement is for proximity pairing.

33. The analyte sensor system of claim 32, wherein the second low power general advertisement includes a secondary identifier associated with the analyte sensor system.

34. The analyte sensor system of claim 33, wherein the secondary identifier associated with the analyte sensor system comprises a Bluetooth low energy (BLE) address with one or more bits flipped.

35. The analyte sensor system of claim 32, wherein the at least one processor is further configured to cause the analyte sensor system to:
accept a connection request from the second display device after the second low power general advertisement is broadcast and in response to a determination that the second display device is not a whitelist device; and
reject one or more connection requests from one or more display devices in response to a determination that the one or more display devices are whitelist devices.

36. The analyte sensor system of claim 35, wherein the at least one processor is further configured to cause the analyte sensor system to:
determine that the second display device is not a previously whitelisted device and that the one or more display device are previously whitelisted devices based on the whitelist maintained at the analyte sensor system.

37. The analyte sensor system of claim 35, wherein the at least one processor is further configured to cause the analyte sensor system:
determine that the second display device is not a previously whitelisted device and that the one or more display device are previously whitelisted devices based on a whitelist indication in the connection request and the one or more connection requests.

38. The analyte sensor system of claim 23, wherein the at least one processor is configured to cause the analyte sensor system to receive the connection request message from the first display device when the analyte sensor system is within a threshold proximity range of the first display device.

39. The analyte sensor system of claim 23, wherein the at least one processor is configured to cause the analyte sensor system to receive the connection request message from the first display device based on the indication indicating the low power general advertisement is for proximity pairing.

40. The analyte sensor system of claim 23, wherein, to perform the authentication procedure with the first display device, the at least one processor is configured to cause the analyte sensor system to:
skip performance of a user-centric authentication protocol in response to the indication indicating the low power general advertisement is for proximity pairing.

41. The analyte sensor system of claim 40, wherein the user-centric authentication protocol comprises a password authenticated key agreement (PAKE) protocol.

42. The analyte sensor system of claim 41, wherein, to perform the authentication procedure with the first display device, the at least one processor is configured to cause the analyte sensor system to:
skip the PAKE protocol; and
perform a public key infrastructure (PKI) protocol.

43. The analyte sensor system of claim 23, wherein, to perform the authentication procedure with the first display device, the at least one processor is configured to cause the analyte sensor system to:
exchange lower power messages with the first display device during the authentication procedure.

44. The analyte sensor system of claim 23, wherein the at least one processor is further configured to cause the analyte sensor system to:
send, to the first display device after pairing and bonding with the first display device, analyte data indicative of blood glucose levels from the analyte sensor system.

* * * * *